(12) United States Patent
Smith

(10) Patent No.: US 7,574,490 B2
(45) Date of Patent: Aug. 11, 2009

(54) STRATEGIES FOR CONFIGURING A SERVER-BASED INFORMATION-TRANSMISSION INFRASTRUCTURE

(75) Inventor: Geoffrey R. Smith, Mountain View, CA (US)

(73) Assignee: Microsoft Corporation, Redmond, WA (US)

(*) Notice: Subject to any disclaimer, the term of this patent is extended or adjusted under 35 U.S.C. 154(b) by 734 days.

(21) Appl. No.: 10/993,786

(22) Filed: Nov. 20, 2004

(65) Prior Publication Data

US 2006/0136581 A1 Jun. 22, 2006

(51) Int. Cl.
*G06F 15/177* (2006.01)

(52) U.S. Cl. .................. 709/220; 709/223; 709/224; 709/226

(58) Field of Classification Search .................. 709/220
See application file for complete search history.

(56) References Cited

U.S. PATENT DOCUMENTS

| | | | | |
|---|---|---|---|---|
| 5,301,337 | A * | 4/1994 | Wells et al. ................ | 718/104 |
| 6,859,926 | B1 * | 2/2005 | Brenner et al. ............. | 718/100 |
| 7,285,487 | B2 * | 10/2007 | DeHon et al. .............. | 438/618 |
| 2003/0005139 | A1 * | 1/2003 | Colville et al. ............. | 709/231 |
| 2003/0009589 | A1 * | 1/2003 | Apostolopoulos et al. ... | 709/239 |
| 2005/0015294 | A1 * | 1/2005 | Williams et al. ............ | 705/10 |

OTHER PUBLICATIONS

Janakiraman, G. (John); Santos, Jose Renato; Turner, Yoshio, "Automated Multi-Tier System Design for Service Availability", Jun. 2, 2003 External, HP Lab Technical Reports, all pages.*

Cherkasova, Ludmila; Tang, Wenting, "Capacity Planning Tool for Streaming Media Services", Oct. 24, 2003 External, HP Lab Technical Reports, all pages.*

* cited by examiner

*Primary Examiner*—Kenny S Lin
*Assistant Examiner*—Hua Fan
(74) *Attorney, Agent, or Firm*—Lee & Hayes, PLLC

(57) ABSTRACT

Strategies are described for determining a configuration of information-transmission infrastructure. The information-transmission infrastructure includes a number of server modules for providing services to a collection of client modules. The configuration first involves determining whether a number of specified requirements can be satisfied using an input scaling equation. If so, the configuration proceeds by determining the number of server modules to deploy to satisfy the requirements using an output scaling equation, which determines the number m of server modules based on a linear transformation of the expected number of client modules. The configuration then involves assigning particular services to the server modules using either a probabilistic technique or a hash table technique. When deployed, all of the m server modules function as active sever modules (e.g., without the use of dedicated standby modules).

28 Claims, 8 Drawing Sheets

STRATEGIES FOR CONFIGURING A SERVER-BASED INFORMATION-TRANSMISSION INFRASTRUCTURE

TECHNICAL FIELD

One exemplary aspect of this subject matter relates to strategies for analyzing infrastructure used to transmit information to client modules. In a more specific implementation, this subject matter relates to mathematical techniques for configuring server-based infrastructure used to transmit media information to client modules.

BACKGROUND

Providers of media information strive to provide reliable service to their clients. To this end, providers will commonly attempt to configure their head-end infrastructures such that the infrastructures will satisfy the demands of the clients. Providers may perform this task by proactively analyzing the theoretical demands that will be placed on the infrastructure. Providers may also perform this task by empirically measuring the load placed on the infrastructure and the ability of the infrastructure to successful handle the load. In either case, the providers may make periodic changes to the infrastructure to is satisfy evolving client demands.

FIG. 1 shows a system 100 comprising a conventional head-end infrastructure 102 that provides media service to a cluster of client modules (104, 106, . . . 108) via a conventional broadcast mechanism 110. Such conventional infrastructure 102 and broadcast mechanism 110 may comprise cable transmission systems, terrestrial antenna transmission systems, satellite transmission systems, and so forth. It is often a relatively straightforward task to design such a conventional head-end infrastructure 102 that satisfies client demand. In part, the manageability of this task ensues from the fact that the conventional system 100 has well defined and stable characteristics that can readily be determined and modeled. For instance, the head-end infrastructure 102 typically provides a single type of output with stable characteristics that can readily be modeled.

Further, the head-end infrastructure 102 typically uses a coupling mechanism that serves the sole purpose of disseminating broadcast information; due to its proprietary nature, the coupling mechanism has relatively reliable and predictable characteristics that can readily be modeled.

Moreover, the design of the head-end infrastructure 102 is, in large part, independent of the functionality used by the client modules (104, 106, . . . 108) and the activities of the client modules (104, 106, . . . 108). For example, consider the classic case where the head-end infrastructure 102 disseminates the broadcast 110 for selective reception by the client modules (104, 106, . . . 108) when the client modules (104, 106, . . . 108) tune to different channels provided by the broadcast 110. The head-end infrastructure 102 must provide functionality which is capable of broadcasting information that can be received by the cluster of client modules (104, 106, . . . 108) spread over a defined geographic area, but otherwise, the design of the head-end infrastructure 102 does not need to directly account for the number of client modules (104, 106, . . . 108) using its services. Further, much of the behavior of the client modules (104, 106, . . . 108) does not directly impact the head-end infrastructure 102. For example, in the traditional case of broadcast via terrestrial antenna, the tuning behavior of the client modules (104, 106, . . . 108) does not require any interaction with the head-end infrastructure 102, so that the design of the head-end infrastructure 102 need not take account for this behavior. All of the above simplifying factors allow the provider to readily design a head-end infrastructure which meets prescribed requirements.

The situation becomes more complex with infrastructures that transmit media information over digital coupling mechanisms in streaming fashion. This increased complexity may ensue from a variety of factors. For instance, streaming environments have characteristics that are more varied and complex compared to traditional systems, and are therefore more difficult to model. For instance, streaming-type infrastructures may provide multiple types of output profiles having different characteristics. Moreover, streaming-type infrastructures may use public coupling mechanisms (e.g., public TCP/IP packet networks, such as the Internet) that do not enjoy the same level of reliability or predictability as conventional proprietary cable or satellite coupling mechanisms.

Moreover, the client modules in a media streaming environment will require more complex interaction with the head-end infrastructure compared to the case of conventional broadcast transmission. This means that the design of the head-end infrastructure must take into account the functionality used by the client modules and the activities of the client modules. Consider, for example, the case of a video-on-demand (VOD) application, where the head-end infrastructure needs to provide individualized service to requesting client modules over a TCP/IP network. By virtue of such unicast service, the number of the client modules that happen to be simultaneously requesting service obviously impacts the load placed on the head-end infrastructure, and therefore must be considered in the design of the head-end infrastructure. Due to all of these factors, the design of the head-end infrastructure poses considerably more challenges compared to the traditional scenario outlined with respect to FIG. 1.

The art has not adequately met the above-identified challenges. Typically, planning strategies resort to various types of simplifying assumptions. Consider the scenario 200 of FIG. 2 which describes a general approach to providing services over a digital packet network. Here, a provider has deployed a collection of working modules (202, . . . 204) and a collection of idle standby modules (206, . . . 208). The provider sets the infrastructure up such that the working modules (202, . . . 204) are deployed in an active mode to provide services to a cluster of client modules (not shown). On the other hand, the provider maintains the standby modules (206, . . . 208) in an inactive mode. In this inactive mode, the standby modules (206, . . . 208) remain idle, meaning that they are not available to provide services to the client modules in this mode. As indicated by the arrow in FIG. 2, upon the failure of a working module (e.g., working module 202), the infrastructure replaces this working module with one of the standby modules (e.g., standby module 208), which then assumes the role of the failed module. Regarding scaling considerations, a provider might use various upper bound (worse case) estimates to determine the number of modules to deploy. A particularly aggressive approach requires that enough working modules be provided to handle the case in which all of the client modules are attempting to access the same resource at the same time.

The above strategies have significant shortcomings. Use of idle modules (206, . . . 208) is inefficient because the idle modules are not actively engaged in providing services to the users while in standby mode. Also, there is typically an appreciable lag time required to substitute a standby module for a failed working module. This lag time may equate to a lapse in service experienced by the client modules.

Using worse-case upper bound scenarios to determine the number of working modules to deploy is likewise wasteful. Namely, the probability that certain upper bound scenarios may occur is typically extremely low. This means that a system which provides enough working modules to handle these upper bound scenarios can be expected to greatly underutilize its processing resources, on average.

There is accordingly an exemplary need in the art for more effective and efficient techniques for configuring and deploying information-dissemination infrastructure.

SUMMARY

According to one exemplary implementation, a method is described for configuring infrastructure used to transmit information to client modules, comprising: (a) determining at least one requirement of the infrastructure; (b) determining whether the above-mentioned at least one requirement can be satisfied; (c) determining, if the above-mentioned at least one requirement can be satisfied, a number m of information-transmission modules that should be provided by the infrastructure; and (d) providing the infrastructure that includes at least the above-mentioned number of information-transmission modules.

According to another exemplary aspect, the information-transmission modules comprise server modules, and the information comprises streaming media information.

According to another exemplary aspect, the above-mentioned at least one requirement is deemed satisifiable if the following equation is satisfied:

$$\vec{I} \cdot \vec{r} = \sum_{i=1}^{n} I_i r_i \leq 1,$$

where $\vec{I}$ defines an input cost fraction vector and $\vec{r}$ defines a replication constant vector.

According to another exemplary aspect, the above-mentioned number of information-transmission modules m is computed based on the following equation:

$$m = c(EV(\text{user})),$$

where $EV(\text{user})$ defines an expected output cost fraction for an individual user, and c defines an expected number of client modules.

The value $EV(\text{user})$, in turn, can be computed as:

$$EV(\text{user}) = \sum_{i=1}^{\tau} EV(\text{streamdisplaytype}_i) * u_i,$$

$$\text{where } EV(\text{streamdisplaytype}) = \left( \frac{\sum_{i=1}^{j} O_i r_i}{\sum_{i=1}^{j} r_i} \right),$$

and where j is the number of services in a stream display type, $\vec{O}$ defines an output cost fraction vector, $\vec{r}$ defines a replication constant vector, and $u_i$ defines a number of simultaneous streams that can be output for a given display type.

According to another exemplary aspect, the above-mentioned at least one requirement specifies plural services to be carried by the infrastructure, and wherein the method further comprises assigning the services to the determined number of information-transmission modules.

According to another exemplary aspect, the assigning comprises assigning the services to the information-transmission modules such that the services are replicated among the information-transmission modules in non-correlated fashion.

According to another exemplary aspect, the providing comprises deploying all of the information-transmission modules to provide services to the client modules, wherein all of the information-transmission modules concurrently have an active status.

Additional implementations and features will be described in the following.

Figure 1:
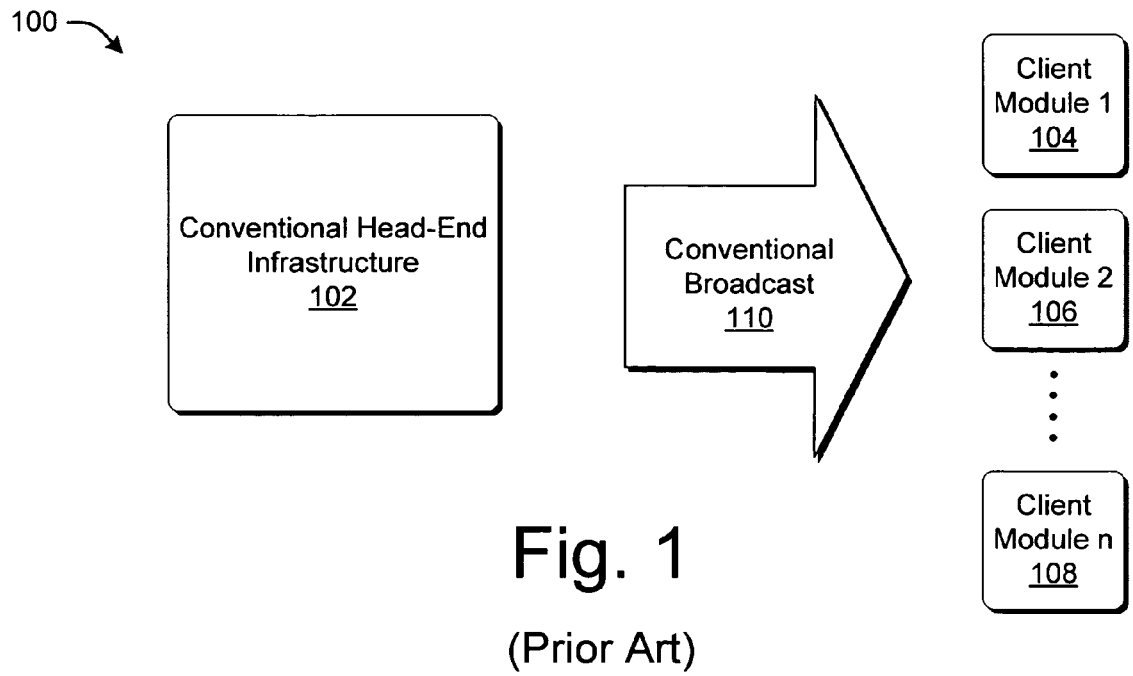
FIG. 1 shows a conventional system used to broadcast media information to client modules.

The same numbers are used throughout the disclosure and figures to reference like components and features. Series 100 numbers refer to features originally found in FIG. 1, series 200 numbers refer to features originally found in FIG. 2, series 300 numbers refer to features originally found in FIG. 3, and so on.

DETAILED DESCRIPTION

Exemplary strategies described herein allow a provider of streaming information to configure a head-end infrastructure that meets prescribed requirements.

One exemplary aspect of the strategies allows the provider to first determine, using an input scaling equation, whether an infrastructure can be configured which meets the prescribed requirements. If the requirements cannot be satisfied, the provider may need to redefine its requirements and expectations.

Another exemplary aspect of the strategies allows the provider to compute, using an output scaling equation, the number m of server modules in the infrastructure that are required to meet the requirements (providing that the requirements are determined to be satisfiable). Such a computation provides a linear transformation which maps an expected number of client modules to the number of server modules m that should be deployed.

Another exemplary aspect of the strategies allows the provider to assign services to individual server modules in a cluster of m server modules. On such assignment technique applies a probabilistic algorithm to assign services to server modules. Another assignment technique applies a perfect hash table to assign services to server modules.

Another exemplary aspect of the strategies pertains to the use of a so-called replication constant vector in the above-described computations. The replication constant vector defines the percentage of server modules in a cluster upon which each service is hosted. The replication constant vector serves as a proxy for both popularity and failover, and thereby eliminates a source of complexity when performing scaling analysis. As to popularity, the extent to which services are replicated among server modules should track the assessed popularity of the services. As to failover, the extent to which services are spread out over the cluster of available server modules defines, in part, the extent to which the infrastructure can successfully address the failure of one or more server modules.

Another exemplary aspect of the strategies enables a provider to apply all of the m server modules that have been configured in the above-described manner to the task of servicing client modules at the same time. That is, the strategies described herein do not use the traditional technique of allocating a first collection of server modules to the role of working modules and a second collection of server modules to the role of backup modules (where the backup modules remain idle until called into action by a failure in one or more of the working modules). In the strategies described herein, backup capacity is built into the system without specifically allocating any of the server modules to the role of passive backup.

The strategies described above have notable benefits over traditional infrastructure design tools. For instance, the strategies provide more accurate assessments of the processing loads that will be experienced by the infrastructure, and thus provide more reliable and efficient recommendations regarding the number of server modules that should be deployed to meet these loads. This is in contrast to traditional approaches, which may recommend that enough server modules be deployed to meet worse case scenarios, such as the case where every client module is attempting to access the same service at the same time. Since the probability that these scenarios will occur is effectively 0 for a large number of clients modules, this approach is not an efficient use of head-end functionality.

According to another benefit, the strategies allocate services to individual service modules in an essentially non-correlated manner (e.g., through the use of a random number generator, a perfect hash table, and so forth). This has the effect of limiting the negative consequences caused by the failure of any particular service and/or server module.

According to another benefit, the strategies deploy all of the server modules designed using the above-described computations as working modules. This feature makes more efficient use of the server modules. This feature also allows the infrastructure as a whole to react to the failure of individual server modules and/or services with reduced lag time compared to traditional systems (which must substitute an offline standby module for the failed server module).

Still other features and attendant benefits will be apparent to those skilled in the art upon reading the following discussion.

As to terminology, the term "information" refers to any data represented in electronic form that can be consumed by a user. The information may be in digital form, analog form, or a combination of analog or digital forms. The information may include, or may omit, interactive content. A specific class of information may pertain to media information. The media information can include any information that conveys audio and/or video information, such as audio resources (e.g., music, etc.), still picture resources (e.g., digital photographs, etc.), moving picture resources (e.g., audio-visual television programs, movies, etc.), computer programs (e.g., games, etc.), and so on. The information can be streamed, meaning that the information is transmitted and consumed in piecemeal sequential fashion, rather than transferred en bloc as an entire file.

The term "service" refers to any unit of information delivered to a client module in a particular manner. In one exemplary case, the services may correspond to different channels provided by the head-end infrastructure, different programs provided by the head-end infrastructure, different parts or component streams of programs provided by the head-end infrastructure, and so forth. Moreover, the head-end infrastructure may offer variations on its services, such as by presenting information in standard definition mode, high definition mode, and so forth. Or the head-end infrastructure may present reduced-size versions of information, e.g., to accommodate the use of picture-in-picture (PIP) displays, and so forth. A client module can receive and process multiple services at the same time. For instance, a client module may record a first stream while a user consumes another "live" stream that is being output to a television screen. Further, a client module can output plural streams at the same time, such as by outputting a first stream in a main section of a television screen, and one or more reduced size streams in one or more respective PIP displays that overlay the main section. The following discussion further clarifies and expands the broad connotation of the term "service," as used herein.

The term "configuration" is used broadly herein to refer to any aspect of the design of the head-end infrastructure. The term configuration can encompass scaling type considerations, such as the number of server modules m in a server cluster. The term configuration can also encompass assignment type considerations, such as the manner in which services are distributed and assigned to client modules in the server cluster.

This disclosure includes: Section A which describes an exemplary system including multiple server modules and a server configuration determination (SCD) module that is used to determine the configuration of the server modules; Section B which describes the manner of operation of the SCD module; and Section C which describes an exemplary computer environment for implementing aspects of the system of Section A.

A. Exemplary System

A.1. Overview of System

Figure 2:
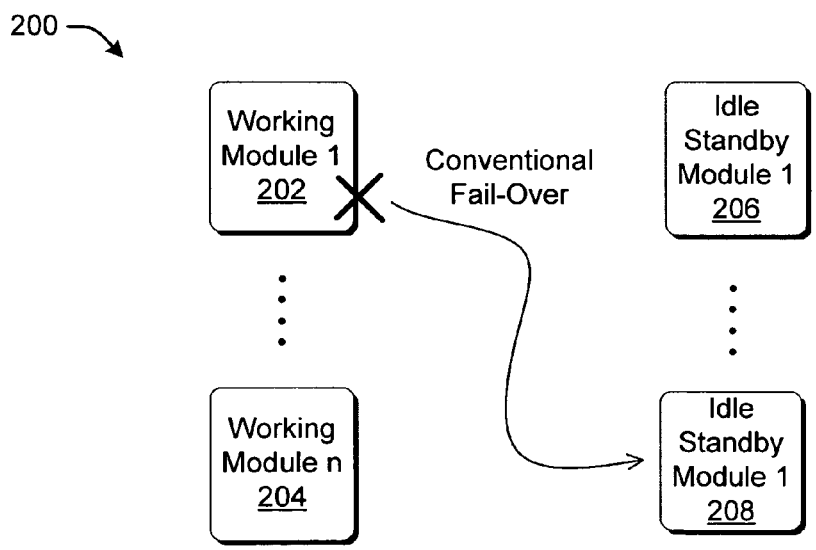
FIG. 2 shows a conventional system for addressing reliability concerns by providing a collection of working modules and idle standby modules.

FIG. 1 shows an exemplary system 300 that can be configured using a service configuration determination (SCD) module 302. Generally, any of the functions described with reference to the figures can be implemented using software, firmware (e.g., fixed logic circuitry), manual processing, or a combination of these implementations. The term "logic, "module" or "functionality" as used herein generally represents software, firmware, or a combination of software and firmware. For instance, in the case of a software implementation, the term "logic," "module," or "functionality" represents program code that performs specified tasks when executed on a processing device or devices (e.g., CPU or CPUs). The program code can be stored in one or more computer readable memory devices. More generally, the illustrated separation of logic, modules and functionality into distinct units may reflect an actual physical grouping and allocation of such software and/or hardware, or can correspond to a conceptual allocation of different tasks performed by a single software program and/or hardware unit. The illustrated logic, modules and functionality can be located at a single site (e.g., as implemented by a processing device), or can be distributed over plural locations.

Broadly, the system 300 includes head-end functionality 304, which comprises electronic infrastructure for delivering one or more services 306 to a collection of clients 308 via a collection of information-transmission modules. In the specific case of FIG. 3, the information-transmission modules comprise a collection of server modules 310. Server modules 310 may be implemented as computer devices configured to provide the services 306 to the clients 308. In this exemplary setup, the role of the SCD module 302 is to determine how many server modules 310 need to be purchased and deployed to satisfy defined requirements, and then to determine how individual services 306 should be allocated to the server modules 310. Additional details regarding the system 300 as a whole will be set forth in this subsection. The following subsection (A.2) provides more detailed information regarding the functionality employed by the SCD module 302 itself.

To begin with, the infrastructure 304 includes acquisition functionality 312 which receives information from one or more sources 314. The sources 314 can represent any kind of entity which produces or provides information, such as conventional cable or satellite television providers, one or more Video-On-Demand (VOD) suppliers of information, one or more publishing houses of information, one or more library sources of information, any kind of Internet-enabled repository of information, and so on. In general, the sources 314 can supply live information or prerecorded information. Live information corresponds to information that captures a current state of an ongoing event (such as a sporting event which is being televised live). Prerecorded information corresponds to information that has already been recorded in its entirety. In one example, an entity that administers the infrastructure 304 can enter into a contractual arrangement with the entity (or entities) that supply the information from the sources 314. In another case, the entity that administers the infrastructure 304 can itself produce at least some of the information that it provides to the clients 308.

The acquisition functionality 312 can comprise one or more server computers dedicated to the task of retrieving the information that it receives from the sources 314. The acquisition functionality 312 can optionally store the received information in one or more databases or files (as will be the case for video-on-demand content). The acquisition functionality 312 also serves the role of forwarding the retrieved information to the servers 310, which, in turn, play a role in providing the information to the client modules 308.

The information provided by the acquisition functionality 312 can be packaged into the above-mentioned services 306. The term "service" refers to any unit of information delivered to a client module in a particular manner. In the case of the delivery of audio-visual media resources, the head-end infrastructure 304 can package a sequence of programs into a defined channel, and that channel can correspond to a service. The user can then consume the programs provided by this service by "tuning" to the channel at prescribed times, or, in another setup, by consuming the programs at any time in an on-demand fashion. It is contemplated that the head-end infrastructure 304 may provide hundreds of services, e.g., corresponding to different channels. Or the term "service" may refer to an individual asset (e.g., a single program) which can be accessed from the head-end functionality 304 based on a fixed time schedule or on an on-demand basis.

To facilitate discussion, the term "service" is most often used in this disclosure in the context identified above, namely as a group of assets (e.g., a channel) or an individual asset (e.g., a program). However, the term "service" can also encompass multiple parts (e.g., chunks) of a single asset (e.g., a single program). For example, a service may comprise a 15 minute portion of a two hour long program. Still further, as will be discussed, a single asset may have different streams associated therewith, such as a main stream associated with the normal playback of the asset, and one or more supplemental streams associated with so-called trick playback modes (e.g., corresponding to fast forward, reverse, and so forth). In one connotation, the term "service" can encompass the entire bundle of streams associated with a single asset. In another connotation, each separate stream associated in the bundle can be considered as a separate service. Accordingly, to repeat, the term "service" is to be broadly interpreted as any unit of information disseminated to the client modules.

Moreover, the head-end structure can offer the same content in different formats, such as a standard definition format, a high-definition format, various kinds of reduced bit rate or annotated formats (e.g., suitable for picture-in-picture type presentations), and so forth. In the typical case, a client module will be consuming only one service at a time (e.g., one channel at a time). However, a client module can also consume plural services at the same time, as in the case where a client module is displaying one channel in a main portion of the television screen and another channel in a picture-in-picture window.

From a high level perspective, the servers 310 can act as a kind of forwarder of media information on prescribed occasions, and therefore have input functionality and output functionality. The input functionality defines the logic that the server modules 310 use to receive the services 306 from the acquisition functionality 312 and to maintain these services 306. For instance, the acquisition functionality 312 may supply the services 306 in a stream of packets, and the input functionality comprises that logic used by the server modules 310 to receive and maintain this stream. In another configuration, the server modules 310 can provide the services as files copied to local storage on the server machines, as would be the case for VOD. Note server module 1 in FIG. 3, for instance, which indicates that this module stores one exemplary VOD service. In this mode of operation, the servers 310 do not stream the services in; they simply store the services as complete assets. For such stored assets, the limiting factor is the persistent storage capacity of the server modules, not the input bandwidth. In any event, any service may be carried by all server modules 310, a subset of the server modules 310 (including only one server module), or possibly no server modules. Various algorithms (to be described in detailed below) provide techniques for assigning specific services 306 to specific server modules 310. In one implementation, any server module can operate as an information forwarder by streaming information in from the acquisition functionality 312 and streaming information out to the client modules 308, and also optionally operate as a disseminator of VOD services that have been stored in their entireties in advance. In another implementation, particular server modules are dedicated to the role of forwarding in the above-described manner, while other server modules are dedicated to the role of disseminating pre-stored VOD information.

On the other hand, the output functionality defines logic that the server modules 310 use to forward the services 306 to the client modules 308. In one case, the server modules 310 can provide the services 306 in one or more so-called output profiles, to be described below. Generally, the capabilities of the input and output functionality are determined (and limited) by the firmware and software employed by the server modules 310, and particularly those components that directly affect the server modules 310's input, and output bandwidth (such as various input and output processing cards employed by the server modules 310).

Beyond the above generalities, the specific role performed by the server modules 310 can differ depending on the particular design of the head-end functionality 304. Microsoft Corporation of Redmond, Wash. has developed several unique applications of the server modules 310, which comprise inventions in their own right, and which are the subject of various co-pending patent applications, including: U.S. patent application Ser. No. 10/683,132, filed on Oct. 10, 2003, entitled "Media Stream Scheduling for Hiccup-Free Fast-Channel-Change in the Presence of Network Chokepoints," naming Dustin L. Green as sole inventor; U.S. patent application Ser. No. 10/789,128, filed on Feb. 2, 2004, entitled "Media Stream Splicer," naming Dustin L. Green et al. as inventors; and U.S. patent application Ser. No. 10/460,949, filed on Jun. 13, 2003, entitled "Fast Start-up for Digital Streams," naming James A. Baldwin et al. inventors. The following discussion will feature exemplary server-related technology developed by Microsoft Corporation. However, the SCD module 302 described herein can be applied to a wide variety of infrastructure designs, not limited to the specific details provided below. Indeed, although the server modules 310 serve as a kind of intermediary or supportive role in the context of the system 300 of FIG. 3, more generally, the SCD module 302 can be used to plan the configuration of any modules within the stream of media delivery, including modules associated with the initial acquisition of the media information, and any other modules serving a downstream role in the delivery.

By way of overview, the server modules 310 in the exemplary strategies developed by Microsoft Corporation can be specifically tailored to address certain challenges that confront the head-end infrastructure 304 in the streaming of media information to the client modules 308. One challenge pertains to difficulties associated with the startup of a service, as when a user first "tunes" to a particular channel using a client module. In a streaming environment, the client module typically cannot instantaneously present a stream of media information upon selection of a program. Two reasons account for this. First, the media information may comprise a series of frames, containing key frames (e.g., I frames) and difference frames (e.g., B and P frames). A key frame contains sufficient information to reconstruct one "snapshot" image within an A-V media information stream, while the difference frames provide delta information which describes how the snapshot image has changed relative to the key frame. Because of this composition, it is necessary that the client module start the presentation of the media information at a juncture in the stream corresponding to a key frame, which, in turn, will impose a delay in the presentation of the media information for broadcast systems (where the client module joins the stream at an arbitrary location) as the client module waits for a key frame.

Second, and more significantly, the transmission medium that couples the server modules 310 to the client modules 308 may be unreliable. This causes delays in the receipt of some media information packets, and generally causes the packets to be received out of order. To handle this challenge, each client module can include a buffer (e.g., exemplary buffer 316) that stores a portion of the received media information. During presentation, the client module draws from this buffer, there being some temporal separation from the time that the client module draws from the buffer and the time when the media information was first received by the client module. This lag provides an opportunity for the client module's buffer to receive additional media packets, some of which may fill any gaps in a previously received sequence of packets. The presentation of media information will be disrupted only when the missing packets are not received by the time that the client module is scheduled to present the missing packets. While beneficial to provide a steadier and more error-free flow of media information, this lag can also pose a delay when the user first tunes to a service. This is because the client module must fill up its buffer to a prescribed level of capacity before presenting the received media information. A user may experience this lag as an undesirable delay in media presentation when changing channels.

The proprietary techniques developed by Microsoft Corporation use the server modules 310 to address the above challenge (as well as to handle retry requests from the client modules 308). Generally, the techniques provide functionality that allows the server modules 310 to more quickly fill the buffers of the client modules 308, and thus allow the client modules 308 to more quickly present media information upon the commencement of services 306. These techniques are generally referred to as "accelerated startup" techniques, because they permit the client modules 308 to more quickly start the presentation of media information. Different techniques can be used to achieve this accelerated startup behavior. Each technique is referred to as an "output mode" herein, and each output mode, in turn, is characterized by an "output profile."

For instance, in a pure unicast accelerated startup output mode, the server modules 310 are requested to stream services 306 to individual client modules 308. In one exemplary case, this mode can use HTTP or UDP as a delivery method. To provide the accelerated startup, the server modules 310 initially send the media information at a high data rate to allow the client modules 308 to quickly start presenting the information. After this initial period, the server modules 310 level off their transmission to provide media information at the nominal bit rate of the streams. But the server modules 310 continue to otherwise handle the transmission of media information to the client modules 308 in a dedicated unicast mode of operation.

In an I-Frame accelerated startup output mode, the client modules 308 contact the server modules 310 to inform the server modules 310 that the client modules 306 are joining new services 306, e.g., in response to channel changes. The server modules 310 respond by returning a key frame (e.g., an I-frame) in-band over HTTP. Thereafter, the client modules 308 switch to UDP multicast for all subsequent media information. In effect, this switch to multicast allows the server modules 310 to pass the client modules 308 over to receive the same multicast stream that the server modules 310 are receiving. The infrastructure 304 can implement the multicast transmission through other functionality (not shown) besides the server modules 310. After the initial period, the server modules 310 may serve the limited role of handling retry requests from the client modules 308.

In a hybrid accelerated startup output mode, the client modules contact the server modules 310 to inform the server modules 310 that the client modules 308 are joining new services 306, e.g., in response to channel changes. The server modules 310 respond with the same initial burst of media information at the high data rate that the server modules 310 deliver in the pure unicast output mode. After this initial burst, the client modules 308 can switch to UDP multicast streams for all subsequent media information. Again, the server modules 310 may not be involved in the multicast transmission. At this point, the server modules 310 may serve the limited role of handling retry requests from the client modules 308.

In certain of the above modes, each of the server modules 310 can provide the accelerated startup functionality by maintaining a sliding circular buffer (not shown) that stores content provided by the services that it carries. When a client module connects to such a server module, the server module begins bursting media information to the client module, starting from a buffered key frame in the circular buffer, and transmitting at a higher data rate than the nominal data rate of the stream. As mentioned above, this allows the client module to present a frame of media information very quickly, as well as catch up to the required buffering delay very quickly. (Starting from a key frame is also advantageous because it means that the client module does not need to sequence through B and P frames before receiving the key frame.)

One way that a server module can coordinate switchover from unicast to multicast is by issuing an instruction which requests a client module to join a multicast stream, while the server module continues to provide media information at a prescribed rate. When a client module begins receiving packets from the multicast stream, it can notify the server module of the sequence number of the first packet received off of the multicast stream. The server module can then continue to broadcast at the full data rate until it has sent all packets up to the first packet received by the client module from the multicast stream.

The appeal of channel changing technology that involves the above-described switchover to multicast is that it potentially allows the head-end infrastructure 304 to use fewer server modules 310 than would be required in a pure unicast accelerated startup output mode (where the sever modules 310 remain dedicated to the unicast-transmission of the services 306 throughout the entire transmission). More specifically, while all of the accelerated startup techniques consume the server module 310's resources during initiation of the services, the output modes that transition to multicast transmission reduce the overall involvement of the server modules 310, which may equate to reduced overall demand on the server modules 310.

It bears repeating that the SCD module 302 has wide application to different infrastructure designs, not limited to the specific output modes described above. For instance, in one less complex case, the server modules 310 can act as packet forwarders that do not employ any kind of accelerated startup provisions. In the context of the present discussion, the main point in the above description of the output modes is that they impose different demands on the resources of the server modules 310. As such, as will be described in Subsection A.2 below, the SCD module 302 should take account for the output profiles that are being used. In one exemplary case, different output modes (and corresponding output profiles) can be associated with different services 306.

Continuing with the explanation of FIG. 1, the system 300 can use any kind of coupling mechanism 318 to couple the head-end infrastructure 304 to the client modules 308. For instance, the coupling mechanism 318 can include any kind of network (or combination of networks), such as a TCP/IP wide area network (e.g., the Internet), an intranet, Digital Subscriber Line (DSL) network infrastructure, point-to-point coupling infrastructure, and so on. In the case where one or more digital networks are used to disseminate information, the coupling mechanism 318 can include various hardwired and/or wireless links, routers, gateways, name servers, and so on. In the case where DSL infrastructure is used to disseminate information, the coupling mechanism 318 can utilize the services, in part, of telephone coupling infrastructure and DSL processing functionality.

The client modules 308 themselves can include any kind of equipment for interacting with the head-end infrastructure 304, processing media information, and presenting the media information on presentation devices (e.g., television units, computer display monitors, audio output equipment, and so forth). In one exemplary case, the client modules 308 can correspond to set-top boxes, game-type consoles (such as Microsoft Corporation's Xbox™ game consoles), software and/or hardware functionality integrated into the associated presentation devices, general purpose or special purpose computer devices, and so forth. In any case, each of the client modules 308 can include one or more processors for executing machine readable code, ROM and RAM memory for storing machine readable code and other data, one or more local stores for storing any data of a more permanent nature than the RAM memory, one or more coupling interface mechanisms for interacting with the head-end functionality 304, an I/O interface for interacting with one or more user input devices, an audio-visual (A/V) interface for interacting with the presentation devices, and various other optional modules. One or more busses couple all of the above-identified components together and coordinate their cooperation. The users may interact with the client modules using various input devices (not shown), such as conventional remote controller type devices, keyboards, mouse-type input devices, joysticks, and so on.

As mentioned, the SCD module 302 performs the role of planning the configuration of the server modules 310. The term configuration as used herein refers to scaling considerations, namely, the number of server modules 310 that are deployed to meet specified requirements. The term configuration also refers to assignment considerations, namely, the allocation of services 306 to particular server modules 310.

In one mode, the SCD module 302 can be implemented as stand-alone functionality that is used to compute the configuration of the server modules 310. For example, the SCD module 302 can correspond to a general purpose or special purpose computer apparatus that has software and/or firmware devoted to performing the mathematical calculations that define the configuration of the server modules 310. This functionality can take various forms. In one case, the SCD module 302 can be configured to provide a spreadsheet that allows an operator 320 to input various input data (to be defined below) into allocated cells of the spreadsheet. The spreadsheet can be configured to provide other cells for reporting the output results of the calculations.

Consider, for example, the case where a first commercial entity provides some aspect of the head-end functionality 304 and/or its associated services 306 to another commercial entity. In this case, the operator 320 can perform configuration planning using the SCD module 302 as part of the package of commitments that the first commercial entity makes to the other commercial entity. The operator 320 can perform this role by bringing a portable computer to the worksite maintained by the other entity and performing the required calculations at that site using the portable computer (which implements the SCD module 302). The entity that maintains the head-end infrastructure 304 can use the recommendations made by the SCD module 302 to manually modify its server configuration. This may involve purchasing more server modules, and/or changing the allocation of services 306 to server modules 310.

In other implementations, certain of the above-described operations can be automated. In one case, the SCD module 302 can comprise functionality that automatically receives a collection of input information defining the current configuration requirements (to be described below). The SCD module 302 can then perform its recommendations.

In other implementations, the system 300 can include functionality for automatically carrying out the recommendations of the SCD module 302. This can be performed by providing a pool of available server modules 310. Functionality can be provided for activating additional server modules within this pool in order to provide a recommended number of server modules issued by the SCD module 302. Other functionality (e.g., switching and routing functionality) can be provided for automatically allocating services 306 to the server modules 310 to implement the assignment recommendations of the SCD module 302.

In a fully automated mode, both the input operations and implementation operations can be automated. In this case, the SCD module 302 can continually monitor conditions in the system 300 and make changes to the infrastructure 304 when required. This fully automatic mode of operation can be performed at periodic times or when certain events within the system 300 exceed prescribed thresholds. The fully automatic mode can affect any change within the system 300 recommended by the SCD module 302 or can implement only certain changes that exceed prescribed thresholds. Still further variations on these design motifs are contemplated.

In any event, once deployed, all of the server modules 310 preferably serve an active role in providing services to the client modules 308. In other words, the techniques described herein preferably do not configure any of the server modules 310 to serve as idle standby modules. Backup capacity can be built into the cluster of server modules 310 that are concurrently operating in active mode by increasing the number of server modules 310 over the minimum recommendations of the SCD module 302. However, each of the server modules 310 in this collection is expected to operate in an active mode by servicing requests from clients when called upon (there being no standby modules per se). The above-described design is beneficial for a number of reasons. First, the elimination of standby modules makes more efficient use of infrastructure 304's server resources (because no server module sits idly without being used). The above-described design is also beneficial because it eliminates the time lag in service that would be caused by the replacement of a failed active module with an idle standby module. This design also makes taking down a subset of the machines for performing rolling software updates less intrusive, as slack has been built into the system.

A.2. Overview of the Server Configuration Determination Module (SCD)

Figure 4:
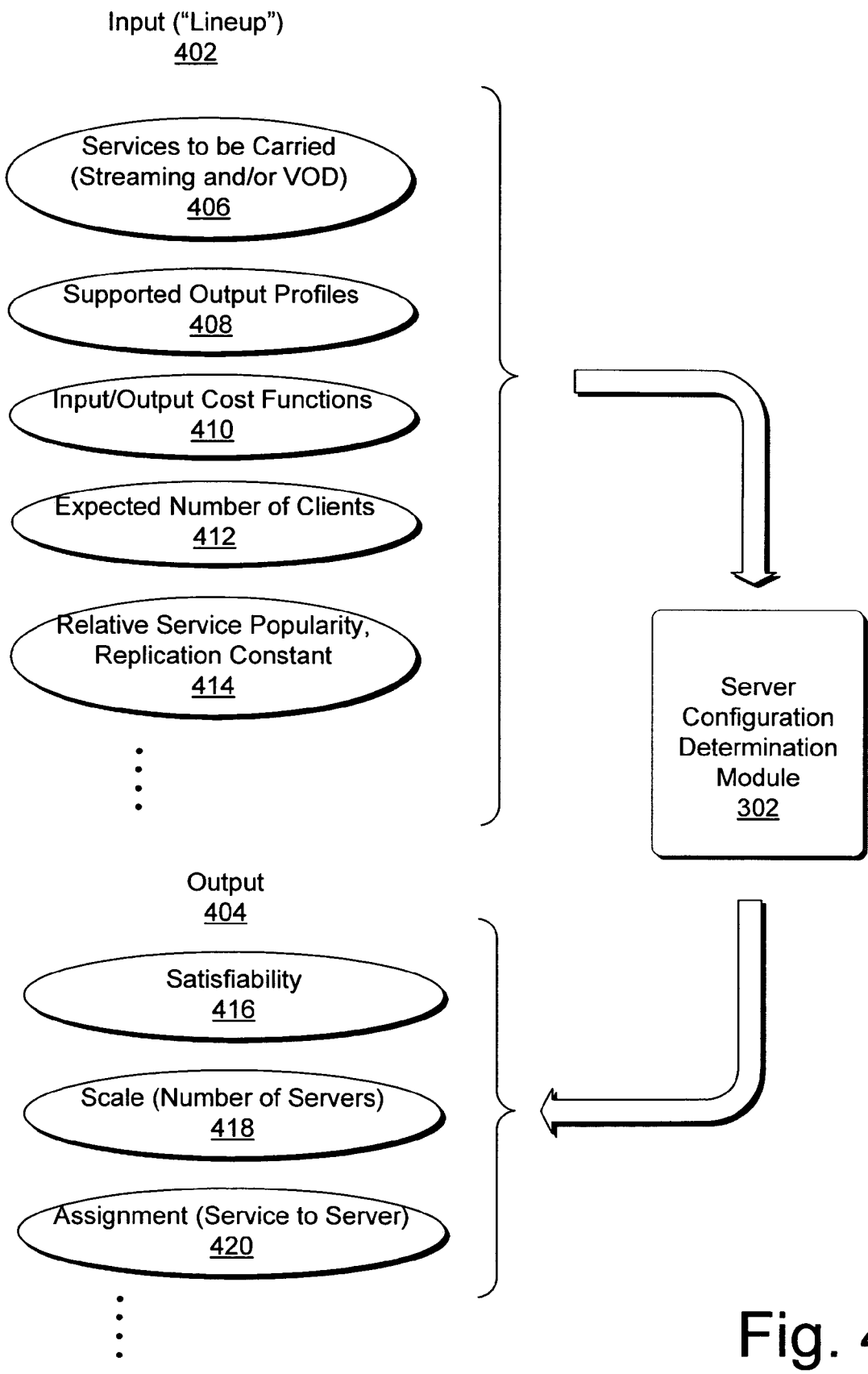
FIG. 4 shows an overview of the configuration of the SCD module.

FIG. 4 shows an overview of the SCD module 302. The SCD module 302 accepts various input information 402, also referred to as the "lineup." The input information 402 defines the requirements of the configuration. Based on the input information 402, the SCD module 302 performs calculations to provide output information 404, also referred to as configuration information. Exemplary "pieces" of the input information 402 and output information 404 will be described below, followed by a discussion of the exemplary calculations performed by the SCD module 302.

As a preliminary matter, various simplifying assumptions and approximations are made in the derivations set forth in this disclosure in order to provide concrete examples, and thereby facilitate the reader's understanding of the subject matter. These assumptions and approximations apply to exemplary technical environments and may not apply to other technical environments. Thus, these assumptions are not to be construed to have a limiting effect on the nature of the computations performed by the SCD module 302.

To begin with, as to the lineup, one piece of the input information 402 is "services to be carried" information 406. This information 406 defines the services 306 to be carried by the server modules 310. In one case, the services 306 may correspond to information that is streamed into the server modules 310 from the acquisition functionality 312 (or from some other source). For instance, the services 306 can correspond, in one exemplary case, to different channels carried by a provider of audio-visual media information. In another case, the services 306 may correspond to assets which are already stored in their entirety by the server modules 310. For instance, these services 306 can correspond to VOD assets available to requesting users on a per-request basis. The services 306 can be enumerated as service number 1 through service number n, written in vector form as $\vec{s}$, expanded as $[s_1 \ldots s_n]$.

Optionally, the model can allow for the specification of the "stream display type" of the stream. The stream display type generally defines how the stream will be presented, e.g., as a picture-in-picture (PIP) output, full-screen standard definition output, full-screen high-definition stream output, and so forth. As will be described later, specifying how the streams will be used by a client module is advantageous, as this allows for more effective output scalability analysis (although this information plays no role in the input scalability analysis). The stream display types can be expressed as $[u_1 \ldots u_T]$, where T is the number of different ways the stream can be displayed on the client module, and $u_t$ is the number of simultaneous streams that the client module's user interface (UI) can make use of in that display type (one full-screen, multiple PIP streams, etc.). Examples which follow shortly will clarify this concept.

Another piece of input information 402 is the "supported output profiles" information 408. This information 408 identifies the type of output modes used by the head-end infrastructure 304 and their corresponding output profiles. Exemplary different types of output modes were described above. To summarize, in the pure unicast accelerated startup mode, the server modules 310 provide unicast transmission of information at higher-than-nominal bit rates at the commencement of the services 306, and thereafter continue to provide unicast delivery of information at a nominal rate. In the I-Frame accelerated startup output mode, the server modules 310 provide key frame information at the startup of the services 306, and thereafter switch over to multicast type delivery. In the hybrid accelerated startup mode, the server modules 310 perform accelerated startup in the same manner as the pure unicast output mode, and thereafter switch over to multicast type delivery. Generally, the output profiles can be symbolically presented by the vector $[p_1 \ldots p_n]$, where each entry in this vector identifies an output profile used by a particular service.

Another piece of input information 402 is the input and output costs function information 410. The input cost function defines the fraction of a server module's input capacity required to maintain a service, and the output function describes the fraction of a sever module's output capacity required to provide the service to a single client module. In the case of pure streaming media, the input function is expressed as $\Phi(b)$. This input function expresses the cost of streaming in a particular service. The cost is assumed to vary as a function of the bit rate b of the service. In the case of VOD, the input function is expressed as $\Phi_{VOD}(b,l,o)$. This input function expresses the cost of maintaining a particular service. The cost is assumed to vary as a function of the stream bit rate b, the length of the asset l, and the percentage overhead o associated with VOD "trick streams." (As mentioned above, the term "trick streams" refers to special streams devoted to special playback modes, such as fast forward, etc.)

For the case of the output function, $\Omega(b,p)$, the cost associated with providing a service to a particular client module can be assumed to be a function of the bit rate b of the service and the output profile p that is being used to provide the service. These are simplifying assumptions that are valid for the exemplary system 300 shown in FIG. 3. Another simplifying assumption stipulates that the input and output loads associated with maintaining and outputting a service are independent functions. Yet another simplifying assumption stipulates that the server modules 310 in a cluster of such modules share the same characteristics.

Given the preferred delivery profile $[p_1 \ldots p_n]$ for each service, it is possible to pre-compute vectors carrying the input and output cost fractions for each service, which are written as $\vec{I}$, and $\vec{O}$, or in expanded form as $[I_1 \ldots I_n]$, $[O_1 \ldots O_n]$. Individual input and output cost fractions for a service i are written as $I_i$, $O_i$. Namely, the input cost fraction $I_i$ describes the faction of a server module's input capacity consumed by maintaining a particular service i, and the output cost fraction $O_i$ describes the fraction of a server module's output capacity consumed by providing the particular service i with a profile p. As an example, if a first service has a bit rate of two megabits per second, the value b has the value $b_1=2,000,000$. For some configuration, possible exemplary cost fractions might be $I_1=0.25$, and $O_1=0.01$. These exemplary cost fractions imply that the server module can take in four services of similar bit rate, and can output those services to 100 different client modules. Similar analysis applies to the case VOD services.

The precise form of the input and output cost functions depends on the server platform used, and the delivery mechanism employed for a service under consideration. By way of illustrative example, and not limitation, exemplary cost functions are derived below for the above-described output profiles (pure unicast accelerated startup, I-Frame accelerated startup, and hybrid accelerated startup). Generally, the input and output cost functions assume that the limitations on input and output are based on fractions of the theoretical peak bandwidth for the server module.

Recall that a service can be received as a stream from the acquisition functionality 312 and then forwarded to the client modules 308; in this mode, the server modules 310 are essential serving a forwarding role. Or a service can be stored in advance for on-demand dissemination (as in the case of VOD services). Different input analyses apply to these two cases. Consider first the case of streaming input services. The input cost function $\Phi(b)$ for all server modules 310 can be described by the same cost function (where b represents bit rate), and that function is independent of the output profile p. In one exemplary and non-limiting environment, the input capacity for streaming media can be approximated to be 33% of the total input capacity of the server module's Ethernet cards. Thus, for a server module with a single gigabit Ethernet card, the available input bandwidth is $10^9/3$, so that $\Phi(b)=3b/10^9$. For a server module with two gigabit Ethernet cards, the available input bandwidth is $2(10^9/3)$, so that $\Phi(b)=6b/10^9$. Generally, based on the above exemplary and non-limiting assumptions, the input cost function can be expressed as $\Phi(b)=3b/\beta$, where $\beta$ is the nominal maximum input bit rate.

The input cost function for VOD, $\Phi_{VOD}(b,l,o)$, describes the "cost" of apportioning the storage resources available to individual server modules 310 so as to maintain (e.g., store) the services. The bit rate b remains an important input for VOD, because it determines the output scalability. However, the input cost function for VOD also depends on additional parameters because the services are stored in their entirety ahead of time, rather than being passed through the system (as in the case of pure I streaming content). The server modules 310 can implement such storage using a hard drive, using the RAM of the machine, or by using any other persistent storage technique. The length parameter l refers to the temporal length of the content, which can be multiplied by the bit rate b to determine the total size of the bit stream. The final parameter, trick stream overhead o, accounts for the potential use of so-called trick streams. Such trick streams may correspond to fast-forward or rewind versions of the information. These versions are pre-generated to allow users to manipulate their viewing of the information using corresponding trick modes (e.g., fast-forward, rewind, etc.) during playback. If no additional trick streams are generated (such that the VOD information may only be viewed from its beginning to end), the overhead parameter o is set to the value 1. In a typical case, where several fast-forward or rewind streams are available, these streams may consume an extra 50% of memory space (for example, a triple-speed stream can be one third the length of the original stream, and so on). Armed with this knowledge, the input cost function for the case of VOD delivery of services can be expressed as:

$$\Phi_{VOD}(b,l,o) = blo/\text{disk space}$$

where b, l and o are as defined above, and disk space refers to an amount of storage provided by a storage medium (or plural storage media) used to store the service.

As to the output cost function $\Omega(b,p)$, different output cost functions are appropriate for different output profiles. Generally, computing the cost functions for accelerated startup output modes is complex because the expected value of usage depends on the behavior of the users, namely, the frequency of channel changes made by users. That is, the server modules 310 provide information at burst rates when the users change channels, after which the head-end-functionality 304 provides the information at the nominal rate (e.g., using either the server modules 310 to continue to deliver the information at the nominal rate in unicast fashion, or by using multicast functionality to deliver the information at the nominal rate, etc.). To model this behavior, one approach is to examine the amount of time it takes to satisfy an accelerated startup request, and then to determine what the expected amount of overlap between client requests will be. If the requests are assumed to overlap 100% of the time, the configuration must provision for the full amount of bandwidth used by a single accelerated startup of that type. If, however, the requests are assumed to overlap only 50% of the time, the configuration must only provision for half of the amount of bandwidth used by the accelerated startup code. Let z represent the percentage of time that a request for an accelerated startup service overlaps with another request for the service.

Consider first the case of the pure unicast accelerated startup output mode, which can be used to provide services that were streamed in from the acquisition server 312, or to provide VOD services that have been pre-stored in their entirety. In one exemplary and non-limiting environment, the available output bandwidth can be assumed to be 80% of the total output capacity of the server module's Ethernet cards. As described above, periods of increased bit rate occur during startup of the service. According to one exemplary and non-limiting application, the increased bit rate can be assumed to be a 25% increase over the nominal bit rate. Further, assume that the percentage of time that a request for this service will overlap with another request for the service is represented by the parameter z (as discussed in the preceding paragraph). Further, assume that the amount of overhead required to handle retry activity is 2% (to address the number of packets that need to be sent as retries). Further, assume that the technique is implemented using a machine with a single gigabit Ethernet card, such that the available output bandwidth is $10^9/1.25$. Given all of these factors, the expected cost can be computed as the extra burst bandwidth for the accelerated start multiplied by the overlap constant, plus the cost of transmitting the stream at nominal bit rate, plus however many packets need to be sent as retries. More formally:

$$\Rightarrow \Omega(b, \text{unicast}) = (1.25(0.25z+1+0.02)b/10^9),$$

$$\Rightarrow \Omega(b, \text{unicast}) = (0.3125z+1.275/\beta)b,$$

where β is the nominal maximum output bit rate. This equation can be more generally stated as follows:

$$\Omega(b, \text{unicast}) = ((Ez+1+F)/\beta^* U_o)b,$$

where E is the extra bandwidth used on burst, F is the packet loss rate, and $U_o$ is the fraction of input bandwidth available for use on output.

Consider next the case of the I-Frame accelerated startup output mode. According to one exemplary application, it is assumed that that a server module delivers the I-Frame to a client module at the nominal bit rate of the service (and if this is not the case to begin with, it can be enforced by configuring the system 300 accordingly). Then, the bit rate effectively required for accelerated startup is given as zb. Applying this to the above-developed analysis yields $\Omega(b, \text{IFrame}) = (1.25(zb+0.02b)/10^9)$, that is, for a server module with a single Ethernet card. As in the case of the pure unicast mode, the second half of the binomial in the numerator accounts for retry requests (because retries are another occasion in which the client modules 308 call on the server modules 310 in this output mode). If it can be assumed that the I-Frame transmission is roughly one quarter of the per-second bit rate, this means that z is proportional to the ratio of users of that service who can be expected to tune to the channel simultaneously within a quarter second. In one exemplary and non-limiting environment, this value can be assumed to be 10%, which results in the cost function $\Omega(b, \text{IFrame}) = (1.25(0.12b)/10^9)$ for a server module with a single Ethernet card. More generally, the cost function for the I-Frame output profile can be written as:

$$\Omega(b, \text{iframe}) = ((0.25z+F)/\beta^* U_o)b,$$

where β is the nominal maximum output bit rate and the other parameters are as defined above.

Consider finally the case of hybrid accelerated startup output mode. Like the above-developed cases for the pure unicast and I-Frame modes, the expected value of the hybrid accelerated start cost function varies depending on the frequency of channel changes. However, in this mode, a server module is responsible for delivering much more media information than just the first I-Frame. More specifically, in this mode, the server module must push enough media information to the client module so that it can begin presenting the media information while it is switching over to the multicast stream. Not only will the media information be pushed at a higher data rate than the nominal bit rate of the stream (to provide accelerated startup), but the stream also must be sustained for several seconds in order to build up sufficient buffer on the client module to switch to multicast without "hiccuping." This increases the amount of estimated overlap on tunes. With these considerations in mind, the base output cost function developed above applies here:

$$\Rightarrow \Omega(b, \text{hybrid}) = (1.25(1.25zb+0.02b)/10^9),$$

that is, for the exemplary case of output on a machine with a single Ethernet card. If we assume that the expected overlap percentage is 25%, the above expression becomes:

$$\Omega(b, \text{hybrid}) \approx (0.42b/\beta),$$

where β is again the nominal maximum output bit rate. This equation can be more generally stated as follows:

$$\Omega(b, \text{hybrid}) = (((1+E)z+F)/\beta^* U_o)b,$$

where β is again the nominal maximum output bit rate and the other parameters are as described above.

Returning to the discussion of FIG. 4, another piece 412 of the input information 402 is the "expected number of clients" information 412. This information 412 defines an approximate number of client modules 308 which are expected to be interacting with the head-end infrastructure 304. This value is represented by the symbol c.

Another piece 414 of the input information is the popularity of the service and the replication constant vector. More specifically, a popularity vector $\vec{\rho}$, or, in expanded form, $[\rho_1 \ldots \rho_n]$, describes the likelihood that any individual client module is making use of service i at any particular time. The sum of all of the entries of this vector will frequently exceed one, because client modules may make use of more than one service at a time (for example, in the case where a user is viewing one service in full screen mode while examining another service as a preview in a PIP window). The popularity values can be empirically computed based on usage data as services are being provided. Alternatively, the popularity values can be set to a constant value, defined as the highest level of concurrent usage ever expected to occur.

A replication constant vector, written as $\vec{r}$, or, in expanded form, $[r_1 \ldots r_n]$, describes the minimum percentage of server modules 310 that each service should be maintained on at all times. Roughly, in other words, this information defines how the different services are distributed among the server modules 310. A replication value acts as a proxy for both the failover resilience of a particular service, and for the number of clients which may simultaneously view that service. In other words, the replication value acts as a proxy for failover resilience because the fewer server modules that a service is carried on, the more likely it is that the failure of some number of server modules will knock the service completely off line. The replication value acts as a proxy for the number of client modules that can simultaneously access the service in the sense that the more server modules that are provided, the more client modules are able to interact with the service.

The delta between the popularity of a service and the replication constant of a service determines how much excess capacity is built into the system for that service. Generally, a configuration will attempt to provide replication constants that are significantly higher than the highest measured value for instantaneous popularity.

The inputs information 402 described above can be summarized in the following manner:

The input information with respect to streaming services are the services $[s_1 \ldots s_n]$, and their associated bit rates $[b_1 \ldots b_n]$, and optionally the stream display types

[$u_1 \ldots u_\tau$]. The services can be identified in any manner, such as providing ID information which identifies the services.

The input information for VOD services are the same as the inputs for the streaming services, and additionally the lengths of the assets [$l_1 \ldots l_n$] and their trick stream overheads [$o_1 \ldots o_n$].

The input information with respect to the server modules are the cost functions $\Phi(b)$, $\Phi_{VOD}(b,l,o)$, and $\Omega(b,p)$, and the set of possible output profiles $\Pi$.

The input information with respect to the client modules are the popularities of each service [$\rho_1 \ldots \rho_n$], and the expected number of clients c.

The input information with respect to the configuration are replication constants [$r_1 \ldots r_n$] and assignments of delivery profile [$p_1 \ldots p_n$] for individual services.

Now turning to the output information 404, one piece of the output information 404 is satisfiability information 416. This output determines whether the requirements defined by the various input information 402 (e.g., the lineup) can be satisfied. In other words, it may be a logical or practical impossibility to implement all of the requirements specified by the input information 402; the satisfiability information 416 identifies whether or not this is the case. If the requirements are not satisfiable, then the operator 320 can modify the requirements and expectations, which amounts to modifying one or more of the pieces of the input information 402.

A second piece of output information 404 is scale information 418. The scale information 418 defines how many server modules 310 need to be purchased and deployed to satisfy the requirements defined by the input information 402. As will be described below, the scale information 418 is computed as a linear transformation of the expected number of client modules c (that is, providing that the satisfiability information 416 indicates that the requirements are satisfiable).

A final piece of output information 404 is assignment information 420. The assignment information 420 defines the manner in which services 306 are to be spread among the server modules 310. The replication constant vector determines how each service is distributed among the server modules 310. In one exemplary case, the assignment information 420 can be expressed as an mxn matrix A. Each row of the matrix represents one of the m server machines identified by the scale information 418, and each column represents a list of the services 306. An entry in the matrix, i.e., A[i,j], is set as "1" if service j is maintained by server module i, and set to "0" otherwise.

Having set forth the input information 402 fed to the SCD module 302 and the output information 404 produced by the SCD module 302, an explanation of the equations used to transform the input information 402 into the output information 404 will now be provided. Subsection B.2 (below) provides exemplary information regarding the derivation of these equations.

To begin with, the SCD module 302 can compute the satisfiability information 416 using the following input scaling equation:

$$\vec{I} \cdot \vec{r} = \sum_{i=1}^{n} I_i r_i \leq 1. \quad \text{(Eq. 1)}$$

In other words, the input scaling equation takes the dot product of the input cost fraction vector $\vec{I}$ and the replication constant vector $\vec{r}$. Recall that the input cost fraction vector $\vec{I}$ is based on the input cost functions for the services $\Phi(b)$ (or $\Phi_{VOD}(b,l,o)$). If the result of this dot product is less than or equal to one, than the input requirements can be satisfied. If not, the requirements cannot be satisfied. The extent to which the dot product is below 1 defines the amount of excess capacity that is available in the infrastructure 304.

If the requirements are deemed satisfiable, then the SCD module 302 advances to its application of the output scaling equation:

$$m = c(EV(\text{user})) \quad \text{(Eq. 2)}$$

This equation computes the recommended number of server modules m to satisfy an average use case by computing the expected output cost fraction (or "expected value" EV) for an individual user of the system, and then multiplying that result by the expected number of client modules c. Note that the recommended number of modules m is a linear transformation of the expected number of client modules c. An operator can build additional redundancy into a server module configuration by introducing a scaling factor x (where x should be greater than 1):

$$m = x(c(EV(\text{user}))) \quad \text{(Eq. 3)}$$

In order to compute the expected cost for the individual user (EV(user)), a "weighted average" is formed. Namely, a numerator is formed by multiplying the expected cost of each individual service ($O_i$) by its respective expected popularity and summing a plurality of those products thus formed; this result is then divided by the sum of the expected popularities. More formally, in the simplest case, where all clients modules are viewing a single stream, this resolves to:

$$EV(\text{user}) = \left( \frac{\sum_{i=1}^{n} O_i r_i}{\sum_{i=1}^{n} r_i} \right).$$

The reader will note that this equation uses replication values, rather than the expected popularity. This matter will be discussed below.

In a more complex case, where, for example, the client modules are viewing at least one PIP stream simultaneously with full-screen streams, the EV analysis takes into account the "stream display type" information. The equation in this more complex scenario is:

$$EV(\text{user}) = \sum_{i=1}^{\tau} EV(streamdisplaytype_i) * u_i,$$

In other words, this equation states that the EV result is formed by summing the expected costs for $\tau$ individual streams having respective stream types (based on their respective weighted average); these expected costs are further multiplied by the number of times the respective streams can be displayed in the user interface of the client module (represented by $u_i$). For example, in a system where the user can be presenting one PIP stream and one FullScreen stream at the same time, the above equation becomes EV(user)=EV(FullScreen)+EV(PIP). In a system where two PIP streams can be presented at the same time, the equation becomes EV(user)=EV(FullScreen) +2*EV(PIP), and so forth.

Moreover, the individual values, can be modified to take percent usage into account. For example, if the client can view two PIP streams at the same time, but such behavior is only expected to be used 50% of the time, $u_{PIP}$ can be set to 1. The equation we used to build up the individual expectation values is:

$$EV(streamdisplaytype) = \left( \frac{\sum_{i=1}^{j} O_i \rho_i}{\sum_{i=1}^{j} \rho_i} \right),$$

where j is the number of services in that stream display type. In the static assignment case, it can be assumed that the assignments of the replication constant will be defined so as to be greater than the values of popularity vector, but in roughly the same proportion to the popularity vector, yielding the equation for the single stream case:

$$\Rightarrow m = c \left( \frac{\sum_{i=1}^{n} O_i r_i}{\sum_{i=1}^{n} r_i} \right).$$

The equations above which take account for multiple stream display types can be translated into replication constant terms in a similar fashion.

Figure 6:
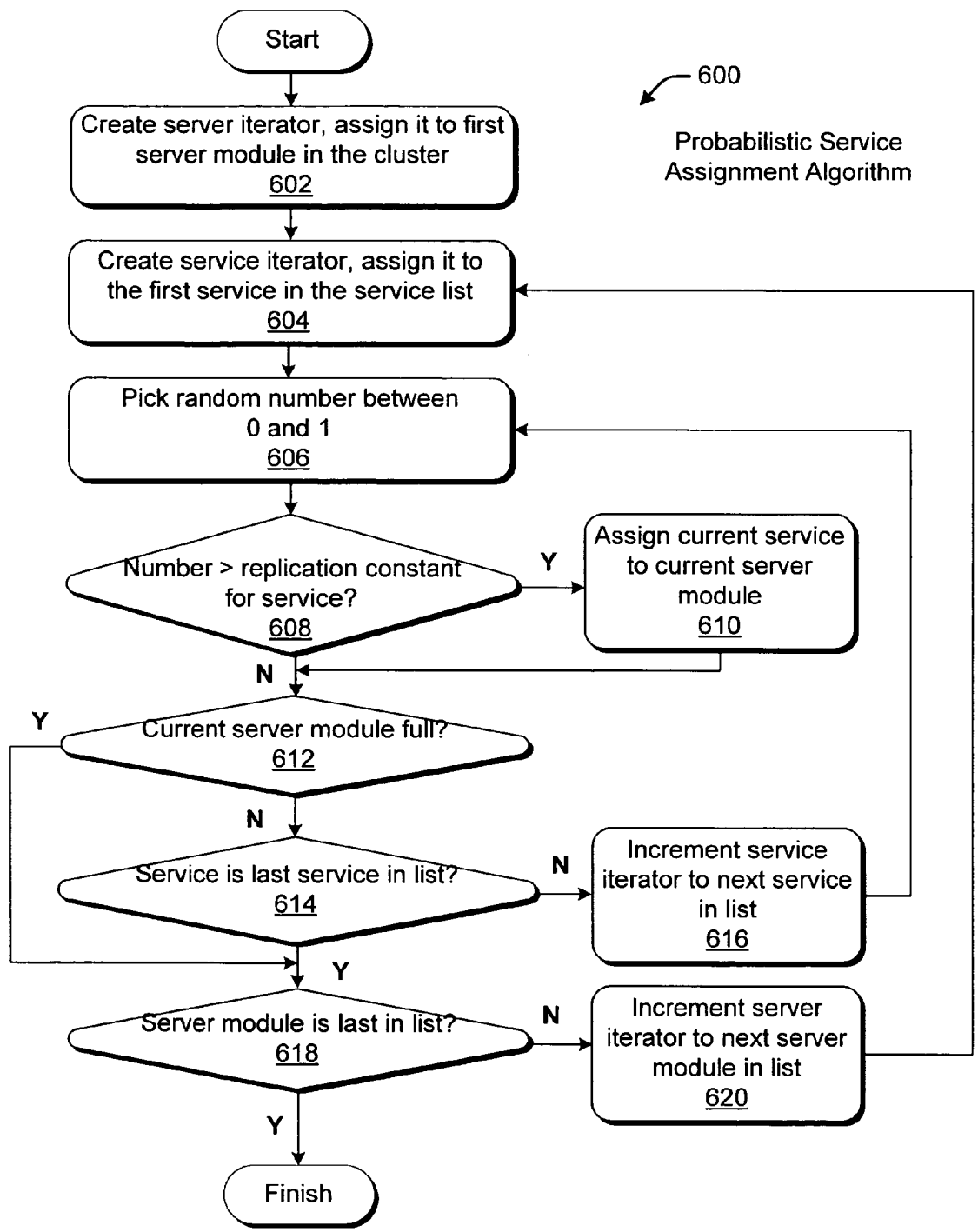
FIG. 6 shows a probabilistic procedure for assigning services to particular server modules using a random number generator.
Figure 7:
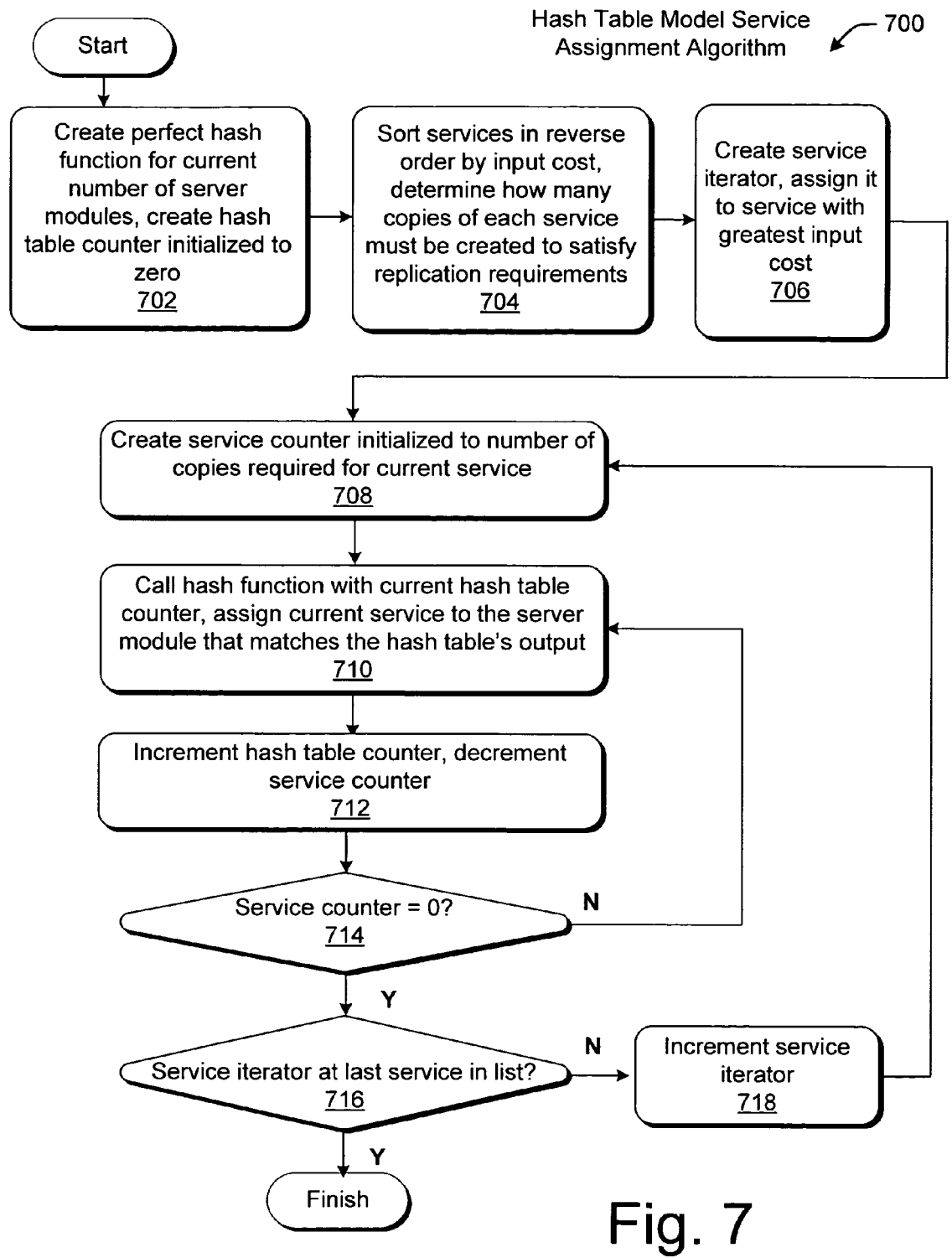
FIG. 7 shows another procedure for assigning services to particular server modules using a hash-table-based approach.
Figure 8:
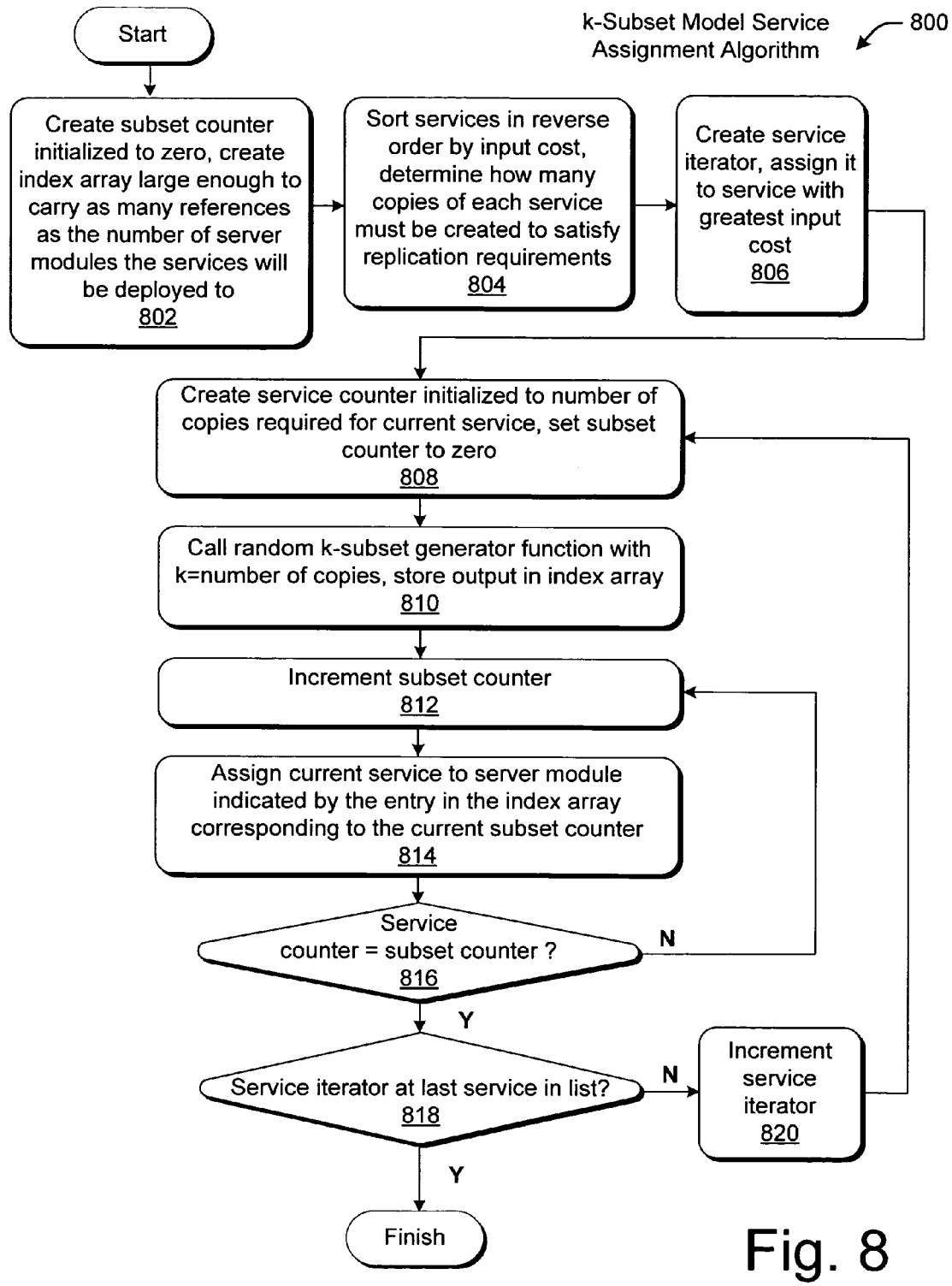
FIG. 8 shows another procedure for assigning services to particular server modules using a k-subset-based approach.

Finally, the SCD module 302 can compute the assignment information 420 by applying various algorithms which provide techniques for assigning the input services 306 to the cluster of m server modules 310. FIGS. 6, 7, and 8 outline three exemplary methods for performing this task, and will be described in detail in Section B. By way of overview, FIG. 6 describes a first algorithm that assigns services 306 to server modules 310 using a probabilistic technique that uses a random number generator. FIG. 7 describes a second algorithm that assigns services 306 to server modules 310 using a perfect hash function. FIG. 8 describes a third algorithm that assigns the services 306 to server modules 310 using a random k-subset generating algorithm (which are a well-known class of algorithms which pick a random subset of k elements from an input list of n elements). All three of these algorithms provide assignments that are uncorrelated, meaning that different service-to-server assignments are not statistically correlated with each other. The assignment can be based on various simplifying assumptions. One simplifying assumption stipulates that there is no performance benefit for correlating particular services to particular server modules. In other words, for example, this assumption stipulates that it is no more efficient for one server module to be distributing two different services to the same client module than it is for that client module to be receiving these services from two different server modules.

As a final topic of this section, the above discussion was primarily based on the simplifying assumption that a single service pertained to either a group of assets or a single asset. However, as noted above, the term "service" can broadly pertain to any unit of information. In one case, the term "service" may refer to part of a single asset (such as a prescribed time segment of a television program). Or a single asset may have multiple component streams (e.g., associated with different trick playback modes); in one case, the term "service" may correspond to the entire bundle of streams associated with an asset, and, in another case, each component stream can be considered as a service in its own right. The follow discussion describes ways in which the above-described analysis can be extended to address these different scenarios.

Consider a VOD service. In the case most commonly evoked in the above discussion, one or more server modules may be assigned the role of storing and disseminating this VOD service, where each of these server modules stores a complete copy of the entire VOD asset (along with any component streams associated therewith).

However, it may not be feasible or desirable to store the entire asset as a single integrated block. Accordingly, parts of this single VOD asset can be distributed among multiple server modules. By way of overview, the various equations developed above can apply to this environment, e.g., by considering the different parts of the VOD asset as separate services.

Two exemplary scenarios will serve to clarify the above feature. Consider a first case in which an asset is broken down into multiple "chunks," each of which carries the data (including trick streams) for a particular time interval of the asset. In this case, each chunk of the asset can be distributed with the same replication constant that was originally assigned to the entire asset. Because the asset is segmented by length, the piecemeal storage of the asset will not have a different overall impact on the server system (compared to the case in which the entire asset is stored as a single unit). Note, for instance, that the "length" variable l in the numerator of the input cost function (for VOD) enables the input scaling model to handle the "chunking" in a straightforward manner with no special adjustments. Further, by bundling each chunk with its corresponding trick streams, the output scaling model can also be applied without modification.

Consider a second case in which, in addition to breaking the asset down into chunks by time, the main stream is decoupled from its supplemental (e.g., trick) streams. Different scaling and assignment considerations can then be applied to the component streams of a single asset. Namely, in this scenario, each trick stream can be handled as its own "service," with its own associated replication constant and scalability considerations. For instance, the replication constant for trick streams can be set lower compared to that of the main stream; this is because users typically spend relatively less time in fast-forward or rewind modes, compared to watching the main stream at normal rate. In this case, the "overhead" variable o in the numerator of the input cost function will be set to 1, because each main stream will be considered separate from its associated trick streams (which are now considered separate services from the main stream). If VOD scaling is handled in the above-described manner, it means that the input and output scaling analysis will need to address a much greater number of services. However, if different trick streams are encoded at different data rates (e.g., a 100× fast-forward stream can encoded at half the data rate of a 5× fast-forward stream), performing analysis which specifically takes this into account can offer more accurate estimates and recommendations. This is assuming, of course, that accurate information can be obtained regarding expected use for the different trick mode streams.

B. Exemplary Operational Characteristics and Examples
B.1. Exemplary Method of Operation FIGS. 5-7 describe the operation of the system 300 of FIG. 3 in flow chart form. To facilitate discussion, certain operations are described as constituting distinct steps performed in a certain order. Such implementations are exemplary and non-limiting. Certain steps described herein can be grouped together and performed in a single operation, and certain steps can be performed in an order that differs from the order employed in the examples set forth in this disclosure.

Figure 5:
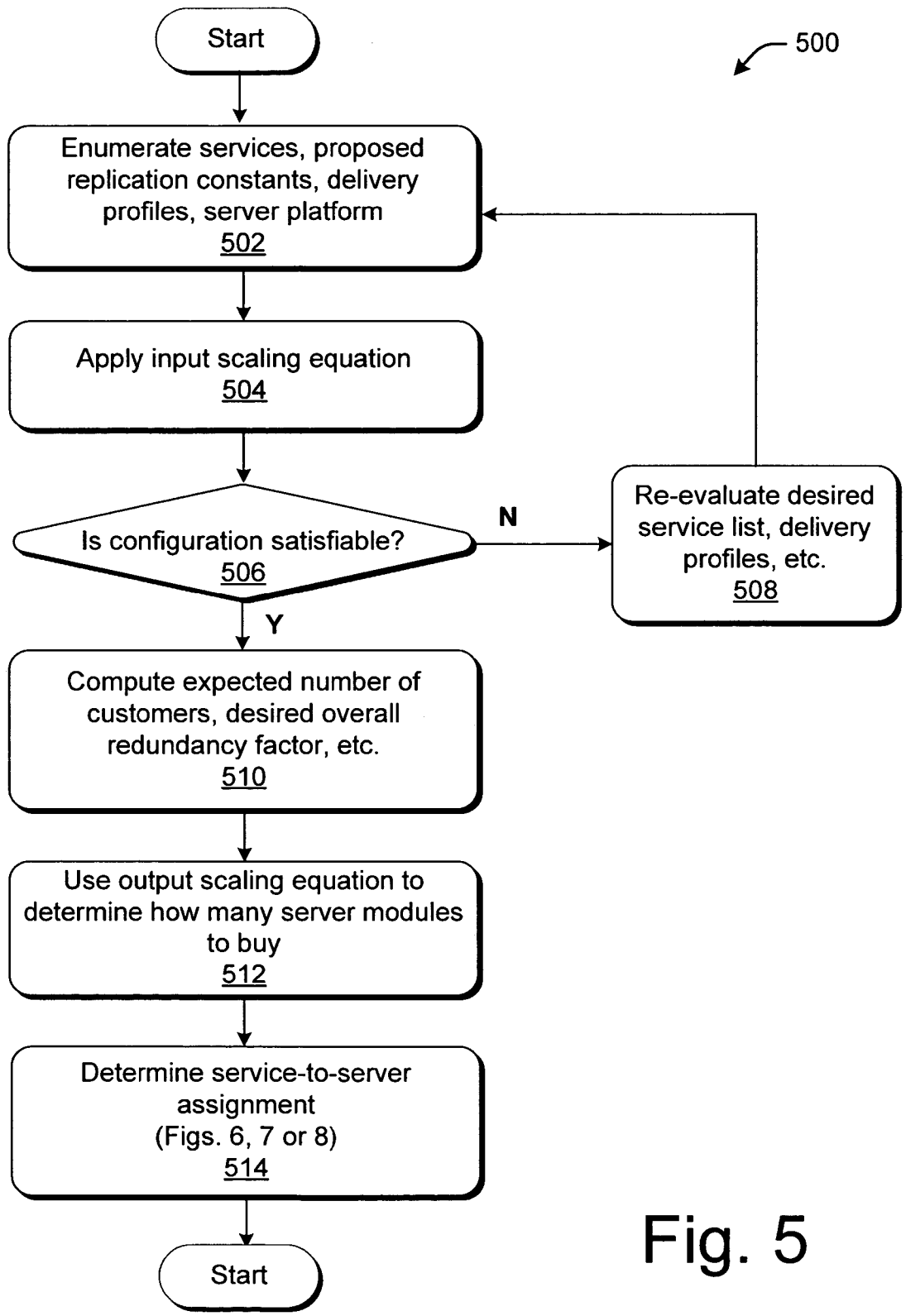
FIG. 5 shows an overview of a procedure for configuring the system of FIG. 3 using the SCD module shown in FIG. 4.

Starting with FIG. 5, this figure shows an overview of a procedure 500 used to configure the head-end infrastructure 304. Step 502 of this method involves collecting various input information 402 defined in the discussion of FIG. 4. Namely, for instance, this step 502 may entail enumerating the services $[s_1 \ldots s_n]$, e.g., by specifying their ID numbers and respective bit rates (and, for VOD, the lengths and trick stream overheads). Step 502 can also involve specifying replication constants $[r_1 \ldots r_n]$, delivery profiles $[p_1 \ldots p_n]$, and so forth. Step 502 can also involve identifying various information regarding the sever platform used to deliver the profiles.

Step 504 involves applying the input scaling equation, e.g., equation (1) defined above. Step 506 entails using the input scaling equation to determine whether the requirements specified in step 502 can be satisfied. If the requirements cannot be satisfied, then step 508 in invoked, which entails re-evaluating the requirements input in step 502. This may involve changing expectations regarding the services that are provided by the head-end infrastructure 304, the delivery profiles used by the services, and so forth. This re-evaluation will ultimately lead to the modification of one or more pieces of input information 402 fed into the SCD module 302.

Providing that equation (1) determines that the equation can be satisfied, then step 510 is invoked. This step 510 entails defining various information used to apply the output scaling equation, such as the expected number of customers c, the desired overall redundancy factor, and so forth. Step 512 then involves applying the output scaling equation. Namely, the above-defined equation (2) can be used to compute the number of server modules m that are required to meet the input requirements, while equation (3) can be used to compute the number of server modules m that are required to meet the input requirements and an extra measure of redundancy defined by a factor x.

Finally, step 514 entails assigning the services to the defined cluster of m server modules. FIGS. 6 and 7 provide two techniques for performing this assignment.

Starting with FIG. 6, this figure shows a procedure 600 to assign services to server modules using a probabilistic technique that makes use of a random number generator. Step 602 of the procedure 600 involves creating a server iterator, and assigning this server iterator to the first server module in the defined cluster of m server modules. Step 604 involves creating a service iterator, and assigning this service iterator to the first service in the list of n services.

Step 606 involves choosing a random number between 0 and 1. Step 608 involves comparing this random number with the replication constant for the particular service under consideration (where the replication constant also defines a number greater than 0 and less than 1). If the random number is less than or equal to the replication constant for this service, then step 610 is invoked. This step assigns the service under consideration to the particular server module under consideration.

If step 608 is not satisfied, step 612 is invoked, which determines whether the server under consideration is full. If not, then the step 614 is invoked, which determines whether the service under consideration is the last service in the list of services. If this is not the case, then step 616 is invoked, which increments the service iterator to point to the next service in the list, and initiates the repetition of the above-identified operations starting with step 606.

Step 618 involves determining whether the current server module is the last server module in the list of m server modules. If not, step 620 is invoked, which increments the server iterator to point to the next server module in the list, and initiates the repetition of the above-identified operations starting with step 604. When the last server module in the list is finally encountered, then the procedure 600 comes to an end.

Generally, the procedure 600 works best for large numbers of server modules. In contrast, FIG. 7 shows a procedure 700 that provides effective non-correlated assignments for any number of sever modules.

The procedure 700 begins in step 702, which involves creating a perfect hash function for the current number server modules m, and then creating a hash table counter initialized to zero. In the context of the present application, a so-called perfect hash function defines a hash function that maps from an input integer to an integer within a particular range, and that, when given sequential input values, does not repeat any integer in the output range before hitting all other integers in the output range.

Step 704 involves storing the services in reverse order by input cost, and determining how many copies of each service should be created to satisfy the input replication requirements.

Step 706 involves creating a service iterator, and assigning it to the service with the greatest input cost. Step 708 involves creating a service counter initialized to a number of copies required for the current service under consideration.

Step 710 then entails calling the hash function with the current hash table counter, and assigning the current service under consideration to the server module that matches the hash table's output. Step 712 involves incrementing the hash table counter and decrementing the service counter. Step 714 involves determining whether the service counter has reached zero, and if not, repeating the above operations, starting with step 710. Step 716 involves determining whether the service iterator has reached the last service in the list. If not, then step 718 is invoked, which increments the service iterator and then initiates the repetition of the above-identified operations, stating with step 708. The process comes to an end when the last service iterator in the list is reached.

FIG. 8 shows a random k-subset selection model procedure 800 for assigning services to server modules. The procedure 800 is similar to procedure 700 of FIG. 7, except that, instead of using a perfect hash function, the procedure 800 pre-generates which server modules will get each service by executing a k-subset selection algorithm, where k is the desired number of machines to which the service shall be replicated, and n is the total number of machines in the cluster.

More specifically, step 802 of the procedure 800 entails creating a subset counter initialized to zero, and creating an index array large enough to carry as many references as the number of server modules the services will be deployed to. Step 804 entails sorting the services in reverse order by input cost, and determining how many copies of each service must be created to satisfy replication requirements.

Step 806 entails creating a service iterator, and assigning the service iterator to a service with the greatest input cost. Step 808 involves creating a service counter initialized to a number of copies required for the current service being considered, and setting the subset counter to zero.

Step 810 involves calling a random k-subset generator function with k equal to the number of copies, and storing the output of this operation in the index array. Step 812 then involves incrementing the subset counter.

Step 814 involves assigning the current service to the server module indicated by the entry in the index array corresponding to the current subset counter.

Step 816 queries whether the service counter is equal to the subset counter. If this is not the case, the processing flow results to step 812, which involves incrementing the subset counter and then repeating step 814.

If the service counter equals the subset counter, then step 818 is invoked, which determines whether the service iterator has identified the last service in the list. If not, then step 820 involves incrementing the service iterator. The above-described process flow is then repeated, starting with step 808. The procedure 800 comes to an end if step 818 is answered in the affirmative.

B.2 Examples and Derivations

The following subsection provides a number of specific examples for the purpose of illustration, and also provides information regarding exemplary derivations of the equations discussed in Subsection A.2.

a. Example for Uniform Distribution

Consider first the exemplary case where all incoming services have the same bit rate. Therefore, the same input cost function applies for each server module. Also, for the purposes of this example, it is assumed that the client modules use a single service at a time. In this case, the above-defined vectors for bit rate, input cost, and output cost all collapse to scalar values, because the bit rates (and therefore the input and output costs) are equal across all services.

More specifically, let I be the input cost fraction for a service (this is the same for all services, because all services are uniform cost). Let O be the output cost fraction for a service (this is the also the same for all services). Let n be the number of input services. Let s be the number of input slots that each server module supports (this is the inverse of the input capacity consumed by the service, that is $s=1/I$. Finally, let m be the number of servers in the cluster.

Consider the following configuration problem for illustration. Given 300 services, each of which takes 1% of the input capacity of a server module, how many server modules are needed so that each service is managed by at least two server modules? And given that, can any of those services be carried on more than two servers?

The problem requires solving for m, given that n=300, s=100, coupled with the requirement that every service must appear twice. This means that the total number of slots which must be available in the cluster is 2n=600. Because total slots=ms=600, m=6. As a special case, in the domain in which n≦s, all services go to every server module, and the desired level of replication is met by simply buying as many server modules as needed to attain the level of replication.

b. Example for Variable Distribution

Consider next that case where some services are known to be much more popular than others. In this case, an operator may choose to provision these popular services to all of the server modules, and then distribute the remaining services evenly across the remaining input slots. In connection therewith, let k be the number of services that are being replicated to all server modules.

A configuration problem pertinent to this scenario is stated as follows. Given n services, each of which takes 1/s of the input capacity of a server module, and a cluster of m machines, how many services k can be replicated to all server modules, while still replicating the remaining services to at least two server modules?

To solve this problem, note that the number of slots left on each server module after some number of services have been reserved for full replication is s−k. The number of input slots which must be available across the cluster to service the remaining number of services is given by the relation 2(n−k). And the total number of remaining input slots across the cluster is m(s−k).

The following equality can be used to determine where the number of remaining slots matches the number which must be available (and therefore the maximum number of services which can be fully replicated):

$$2(n-k)=m(s-k),$$

which leads to $2n-2k=sm-km$, which, in turn, leads to $k=(sm-2n)/(m-2)$.

Note that if m<2, this expression stops making sense (as it should, because it is not possible to ask for double replication with fewer than two server modules). Also, if m=2, the expression becomes unbounded, because there is no difference between "putting to all machines" and "putting to two machines."

Therefore, plugging in 100 slots, 300 services and 10 server modules into the above equation yields a result that specifies that 50 of the services could be replicated to all server modules (the cost being, of course, that each of the other services are only replicated on two server modules).

To slightly extend the model, the hard-coded "2" can be replaced with any value. Assume, for example, that it is desired that each service be carried on three server modules at a time, except for the few services that should be carried on all of the server modules. To analyze this scenario, let j be the number of server modules that non-fully distributed services should be sent to, and let j<m. The above equation then becomes $k=(sm-jn)/(m-j)$. Plugging in the values of 100 slots, 300 services, 10 servers, and j=3 yields the following result: $k=(100\times10-3\times300)/(10-3)=100/7=14$. This result implies that 14 services are carried on all server modules, and the remaining 286 are available to three servers.

These equation can also inform the operator when a situation has been encountered that cannot be supported, e.g., when either the top or bottom expression becomes zero or less than zero. An unsatisfiable condition due to the value in the denominator means that requirements have been specified that require the replication of a service to more server modules than exist. Because the numerator reflects the total number of available slots minus the number of required slots (replication parameter times the number of input streams), when the numerator becomes less than zero, this implies that the replication constant that is desired is unattainable, even when k=0. For example, consider the current example and assume that that it is desirable that each non-fully-replicated service be serviced by four server modules at a time. The total number of slots is 10*100. The total number of required slots is 4*300, but 1200 is greater than 1000, so this configuration cannot be achieved.

c. Exemplary Derivation of the Scale Independent Model (Equation 1)

Instead of having a numerically fixed replication constant invariant over the number of sever modules, it is possible to base the replication constant on a percentage. In this case, j would become a function of m, rather than a free variable.

More formally, let r be the minimum guaranteed replication ratio for non-fully-replicated services (which defines the percentage of server modules in the cluster that each service appear on), where 0<r<1. The equations become:

$(n-k)(rm)=m(s-k)$, which can be expressed as $rnm-rmk=sm-mk$, which in turn can be expressed as $k=(sm-rnm)/(m-rm)=(s-rn)/(1-r)$.

This relation is independent of m, and therefore is independent of the number of server modules involved (keeping in mind that the cluster must still have a minimum size of 1/r to ensure single coverage for all services, or 2/r to ensure double coverage for all services).

If r=20%, s=100, and n=300, the value of k can be computed to be: k=(100−(0.2×300))/0.08=50, which matches the earlier calculation for a specific case (e.g., 10 server modules, with each service replicated to 2 server modules). But note that this analysis now holds regardless of the number of server modules in the cluster.

Similarly, consider the case where it is desired to have 30% coverage for non-fully-replicated services. This yields k=(100−(0.3×300))/0.7=14, which means that (assuming that the cluster is at least 3.11, rounded up to 4 server modules) the equations specifies that 14 services are carried on all server modules, and all other services are carried by 30% of the server modules.

The same invalidity scenarios apply with respect to the numerator. If the numerator ever becomes negative, this implies that an attempt has been made to perform more with the server cluster than it can handle. Solving for zero in the numerator yields the maximum percentage coverage that can be attained for each individual service if the services are all distributed evenly across the cluster:

$s-rn=0$, and $r=s/n$.

Values of r between 0 and the ratio of the number of input slots to the number of input streams are valid. Values of r greater than that ratio represent goals which cannot be achieved. If the number of input slots is greater than the number of input streams, it is I possible to send every stream to every server. This analysis identifies the maximum "fair" number of server modules maintaining each stream, where "fair" means that each stream can be maintained on the same number of servers.

d. Derivation of Input Satisfiability Equation for Uniform Cost Services

The discussion in the previous section implies that a lineup is satisfiable if and only if $$I\sum_{i=1}^{n} r_i \leq 1,$$

which can be expressed as $$\sum_{i=1}^{n} r_i \leq 1/I.$$

Of course, it is necessary to have a cluster large enough for the distribution to be performed. Clusters of size $m \geq 1/\min(r_i)$ ensure that each service goes to at least one server module, while clusters of size $m \geq 2/\min(r_i)$ ensure that each service goes to at least two server modules. The more services that are carried, the more server modules need to be provided. This further requires that small clusters have high replication constants.

e. Derivation of Scaling Equation for Uniform Cost Services with Single-Stream Clients The output scaling equation for uniform cost services is derived as follows. The derivation begins by expressing the expected value of the demand that a single user will make on a server module: EV(user)=O, which implies that $$EV(\text{subscribers per machine}) \approx \left(\frac{1}{O}\right),$$

which, in turn, implies that m=cO. This leads to the logical conclusion that the number of server modules to be purchased is the product of the number of customers and the output cost fraction for a service.

f. Input Satisfiability Equation for Variable Bit Rates

The input satisfiability equation for variable bit rates operates on the expectation value of input resource allocation for a particular server module. By analogy to the uniform bit rate analysis, the derivation integrates over an entire cluster, and re-normalizes back to an individual server module. This yields equation (1) identified above, namely:

$$\vec{I} \cdot \vec{r} = \sum_{i=1}^{n} I_i r_i \leq 1.$$

Once the minimum cluster size ($m \geq 1/\min(r_i)$, as described above) is reached, this equation is scale-invariant. When a lineup is satisfiable, it is possible to naively use the output scaling equation (2) to determine how many machines to purchase. This also means that there exists an assignment matrix A that satisfies $[1/m, \ldots 1/m]A \geq \vec{r}$, where $[1/m, \ldots 1/m]$ is an m-element vector, and $\geq$ is understood to mean "each element is greater than or equal to the corresponding element of."

As with the uniform case, it is possible to derive a "fair distribution," in which every service has the same replication constant. Setting the satisfiability equation to its maximum yields $$\sum_{i=1}^{n} I_i r_i = 1.$$

But all replication constants are the same, which yields $$r \sum_{i=1}^{n} I_i = 1,$$

which in turn yields, $$r = \left(\sum_{i=1}^{n} I_i\right)^{-1}.$$

If the sum of the input costs is less than one, this means that all services are distributable to all server modules, and the replication constant will be >1, just like in the case for uniform services, where n≧s.

g. Output Scaling Equation for Variable Bit Rates

This subsection analyzes the expected value (EV) of the demand that a single customer will make on a server module machine, expressed as a fraction of the total output capacity of that machine. This result is then extended to the number of machines required for a particular number of clients. As many of the concepts developed in this subsection have been previously set forth in Section A, this subsection will serve primarily as review and restatement.

To begin with, the expected cost of an individual stream can be computed by:

$$EV(\text{stream}) = \left(\frac{\sum_{i=1}^{n} O_i \rho_i}{\sum_{i=1}^{n} \rho_i}\right).$$

This equation defines a weighted average of the output cost fraction for an individual stream, computed by multiplying the probability of a service being used by its cost and re-normalizing by the sum of the probabilities. However, this equation may not describe the expected cost for a user for two reasons. First, a user may be using two streams at once (for example, the user may be watching one program "live" while recording another program in the background). Second, the media delivery system and the client module user interface (UI) will often be configured to provide certain services in particular respective areas of the interface. This makes it possible to make usage projections, such as "there will be one FullScreen and one PIP stream in use," or "there will be one FullScreen and six PIP streams in use," and so forth. The above-defined stream "display type" becomes useful in these scenarios, because it allows the analysis to provide more accurate predictions of a customer's expected cost.

The expect value for the multi-stream scenario can be expressed as:

$$EV(\text{user}) = \sum_{i=1}^{\tau} EV(\text{streamdisplaytype}_i) * u_i.$$

This equation basically says that the final EV(user) result is formed by a summation of separate weighted average EV(stream) values corresponding to different display types, where each separate EV(stream) value is multiplied by the number of times the stream can be displayed in the user interface (represented by $u_t$). For example, in a system where the user can be presenting one PIP stream and one FullScreen stream at the same time, the equation becomes:

$$EV(\text{user}) = EV(\text{FullScreen}) + EV(\text{PIP}).$$

In a system where two PIPs may be presented at the same time, yielding the equation:

$$EV(\text{user}) = EV(\text{FullScreen}) + 2*EV(\text{PIP}).$$

As described above, the individual values $[u_1 \ldots u_T]$ may be modified to take percent usage into account. For example, if the client may view two PIPs at the same time, but such behavior is only expected to be used 50% of the time, $u_{PIP}$ may be set to 1.

The equation used to build up the individual expectation values is:

$$EV(\text{streamdisplaytype}) = \left(\frac{\sum_{i=1}^{j} O_i \rho_i}{\sum_{i=1}^{j} \rho_i}\right),$$

where j is the number of services in that stream display type.
Going back to scalability, $$\Rightarrow EV(\text{subscribers per machine}) = (EV(\text{user}))^{-1},$$

so that:

$$\Rightarrow m = c(EV(\text{user})).$$

If there is only one stream display type under consideration, and the client module is assumed to be only displaying one stream at a time, the above analysis collapses to:

$$\Rightarrow m = c\left(\frac{\sum_{i=1}^{n} O_i \rho_i}{\sum_{i=1}^{n} \rho_i}\right).$$

This equation operates on the expectation value of output resource usage by an individual client module, and is scale invariant. This assumes even distribution of client module demand across server modules, which may be implemented by having the client module randomly select which server module (out of the server modules maintaining a service) it will connect to.

In the static assignment case, the assignments of the replication constants will be greater than the values of popularity values, but otherwise in roughly the same proportion. This allows the above equation to be expressed as:

$$\Rightarrow m = c\left(\frac{\sum_{i=1}^{n} O_i r_i}{\sum_{i=1}^{n} r_i}\right)$$

for the single stream case. The equations above accounting for multiple stream display types can be translated into replication constant terms in a similar fashion.

C. Exemplary Computing Environment

Figure 3:
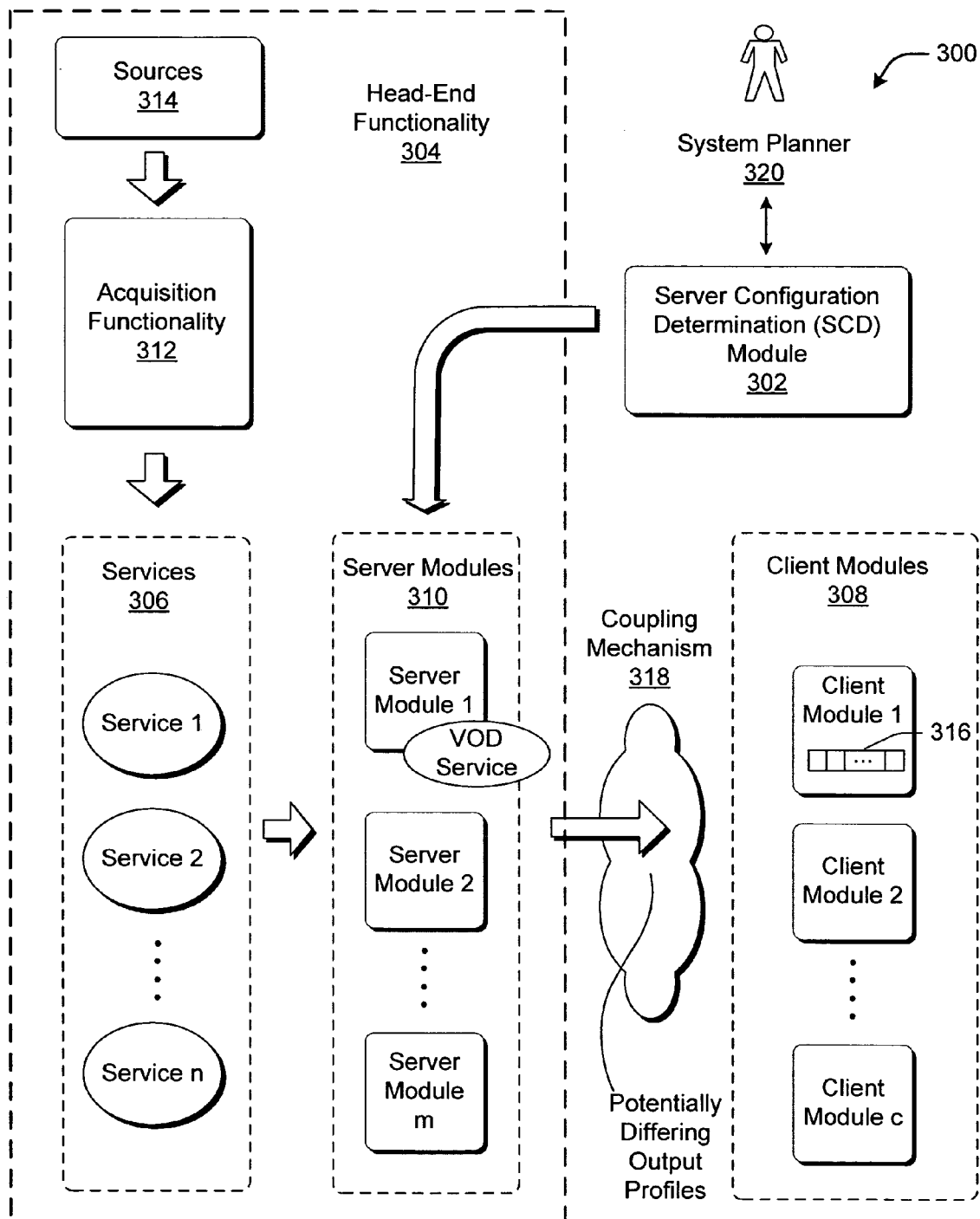
FIG. 3 shows a system including plural server modules, and a server configuration determination (SCD) module used to analyze and design the configuration of such a system.
Figure 9:
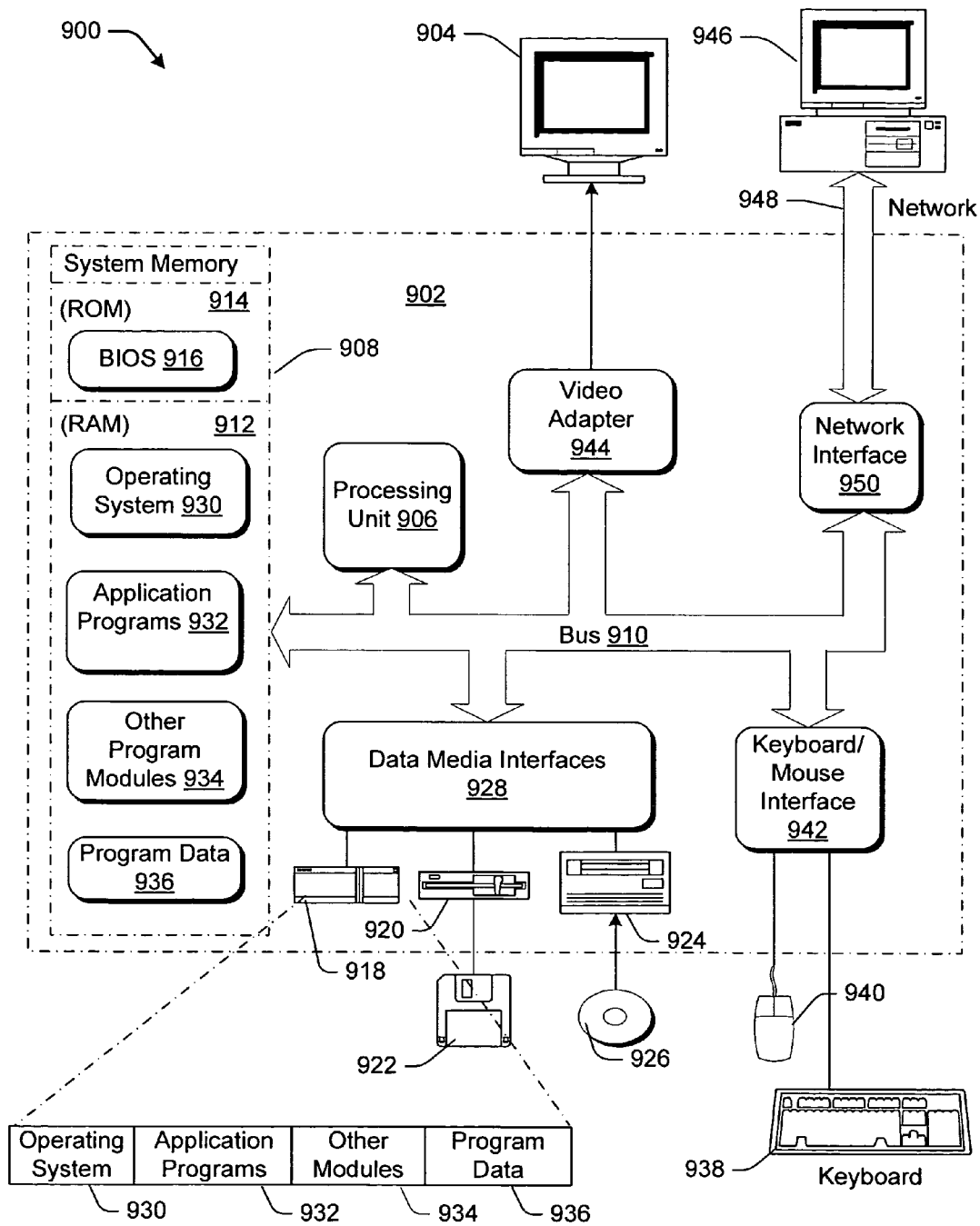
FIG. 9 shows an exemplary computer environment that can be used to implement aspects of the system shown in FIG. 3.

FIG. 9 provides information regarding one exemplary computer environment 900 that can be used to implement various aspects of the system 300 shown in FIG. 3. Namely, the computer environment 900 describes a computer apparatus that can be used to implement any of the server modules 310, any of the client modules 308, or the sever configuration determination (SCD) module 302 itself, and so forth.

The computing environment 900 includes any kind of computer 902 and a display device 904. FIG. 9 shows elements of the computer environment 900 grouped together to facilitate discussion. However, the computing environment 900 can employ a distributed processing configuration. In a distributed computing environment, computing resources can be physically dispersed throughout the environment.

Exemplary computer 902 includes one or more processors or processing units 906, a system memory 908, and a bus 910. The bus 910 connects various system components together. For instance, the bus 910 connects the processor 906 to the system memory 908. The bus 910 can be implemented using any kind of bus structure or combination of bus structures.

Computer 902 can also include a variety of computer readable media, including a variety of types of volatile and non-volatile media, each of which can be removable or non-removable. For example, system memory 908 includes computer readable media in the form of volatile memory, such as random access memory (RAM) 912, and non-volatile memory, such as read only memory (ROM) 914. ROM 914 includes an input/output system (BIOS) 916 that contains the basic routines that help to transfer information between elements within computer 902, such as during startup. RAM 912 typically contains data and/or program modules in a form that can be quickly accessed by processing unit 906.

Other kinds of computer storage media include a hard disk drive 918 for reading from and writing to a non-removable, non-volatile magnetic media, a magnetic disk drive 920 for reading from and writing to a removable, non-volatile magnetic disk 922 (e.g., a "floppy disk"), and an optical disk drive 924 for reading from and/or writing to a removable, non-volatile optical disk 926 such as a CD-ROM, DVD-ROM, or other optical media. The hard disk drive 918, magnetic disk drive 920, and optical disk drive 924 are each connected to the system bus 910 by one or more data media interfaces 928. Alternatively, the hard disk drive 918, magnetic disk drive 920, and optical disk drive 924 can be connected to the system bus 910 by a SCSI interface (not shown), or other coupling mechanism. Although not shown, the computer 902 can include other types of computer readable media, such as magnetic cassettes or other magnetic storage devices, flash memory cards, CD-ROM, digital versatile disks (DVD) or other optical storage, electrically erasable programmable read-only memory (EEPROM), etc.

Generally, the above-identified computer readable media provide non-volatile storage of computer readable instructions, data structures, program modules, and other data for use by computer 902. For instance, the readable media can store the operating system 930, application modules 932, other program modules 934, and program data 936.

The computer environment 900 can include a variety of input devices. For instance, the computer environment 900 includes the keyboard 938 and a pointing device 940 (e.g., a "mouse") for entering commands and information into computer 902. The computer environment 900 can include other input devices (not illustrated), such as a microphone, joystick, game pad, satellite dish, serial port, scanner, card reading devices, digital or video camera, etc. Input/output interfaces 942 couple the input devices to the processing unit 906. More generally, input devices can be coupled to the computer 902 through any kind of interface and bus structures, such as a parallel port, serial port, game port, universal serial bus (USB) port, etc.

The computer environment 900 also includes the display device 904. A video adapter 944 couples the display device 904 to the bus 910. In addition to the display device 904, the computer environment 900 can include other output peripheral devices, such as speakers (not shown), a printer (not shown), etc.

Computer 902 operates in a networked environment using logical connections to one or more remote computers, such as a remote computing device 946. The remote computing device 946 can comprise any kind of computer equipment, including a general purpose personal computer, portable computer, a server, a game console, a network extension device, and so forth. Remote computing device 946 can include all of the features discussed above with respect to computer 902, or some subset thereof.

Any type of network 948 can be used to couple the computer 902 with remote computing device 946, such as a WAN, a LAN, etc. The computer 902 couples to the network 948 via network interface 950, which can utilize broadband connectivity, modem connectivity, DSL connectivity, or other connection strategy. Although not illustrated, the computing environment 900 can provide wireless communication functionality for connecting computer 902 with remote computing device 946 (e.g., via modulated radio signals, modulated infrared signals, etc.).

In closing, a number of examples have been presented in this disclosure in the alternative (e.g., case A or case B). In addition, this disclosure encompasses those cases which combine alternatives in a single implementation (e.g., case A and case B), even though this disclosure may not expressly mention these conjunctive cases in every instance.

More generally, although the invention has been described in the context of specific to structural features and/or methodological acts, it is to be understood that the invention defined in the appended claims is not necessarily limited to the specific features or acts described. Rather, the specific features and acts have been presented as exemplary strategies for implementing the claimed invention.

What is claimed is:

1. A method for configuring infrastructure used to transmit information to client modules via a set of services, comprising:

determining at least one requirement of the infrastructure;

determining, via a processor executing instructions of a service configuration determination module, whether said at least one requirement can be satisfied for a plurality of server modules, wherein the at least one requirement is deemed satisfiable if the following equation is satisfied:

$$\vec{l}\cdot\vec{r} = \sum_{i=1}^{n} l_i r_i \leq 1,$$

where $\vec{l}$ defines an input cost fraction vector, $\vec{r}$ defines a replication constant vector, and n is equal to or greater than two, each input cost fraction defining a fraction of input capacity of a sever module consumed by maintaining a particular service, each replication constant defining a minimum percentage of server modules that the particular service should be maintained on;

if said at least one requirement can be satisfied, computing a number of m server modules based on a linear function that relates an expected number of client modules to the number m of server modules that should be provided by the infrastructure, wherein the number of m server modules is computed based on the following equation:

$$m=c(EV(\text{user})),$$

where EV(user) defines an expected output cost fraction for an individual user, and c defines an expected number of client modules greater than zero; and providing the infrastructure that includes at least said number of m server modules.

2. The method of claim 1, wherein said information comprises streaming media information.

3. The method of claim 1, wherein at least one service of the set of services comprises a channel used to transmit media information to the client modules.

4. The method of claim 1, wherein said at least one requirement specifies at least one output profile to be used by the infrastructure to transmit information to the client modules.

5. The method of claim 4, wherein said at least one output profile pertains to a protocol whereby at least one of the server modules transmits information to the client modules in uni-cast fashion.

6. The method of claim 4, wherein said at least one output profile pertains to a protocol whereby at least one of the server modules transmits information to the client modules in a combination of unicast and multi-cast transmission.

7. The method of claim 4, wherein said at least one output profile pertains to a protocol whereby at least one of the server modules transmits information to the client modules at a higher than nominal bit rate at the commencement of transmission.

8. The method of claim 1, wherein each input cost function defines the cost to at least one of the server modules to handle a service having a defined characteristic.

9. The method of claim 8, wherein said input cost function defines a fraction of said at least one server module's transmission-related resources consumed as a function of a bit rate of the service.

10. The method of claim 8, wherein the input cost function pertains to the cost associated with inputting the service.

11. The method of claim 8, wherein the input cost function comprises an output cost function pertaining to the cost associated with outputting the service to the client modules.

12. The method of claim 1, wherein said at least one requirement specifies an expected number of client modules that will interact with the infrastructure.

13. The method of claim 1, wherein EV(user) is computed as:

$$EV(\text{user}) = \sum_{i=1}^{\tau} EV(streamdisplaytype_i) * u_i,$$

$$\text{where } EV(streamdisplaytype) = \left( \frac{\sum_{i=1}^{j} O_i r_i}{\sum_{i=1}^{j} r_i} \right),$$

and where j is the number of services in a stream display type greater than zero, $\tau$ comprises a number of streams, $\vec{O}$ defines an output cost fraction vector, each output cost fraction describing a fraction of server module output capacity consumed by providing a particular service, $\vec{r}$ defines a replication constant vector, each replication constant defining a minimum percentage of sever modules that the particular service should be maintained on, and $u_i$ defines a number of simultaneous streams that can be output for a given display type.

14. The method of claim 1, wherein said at least one requirement specifies plural services to be carried by the infrastructure, and wherein the method further comprises assigning the services to the determined number m of server modules.

15. The method of claim 14, wherein the assigning comprises assigning the services to the server modules such that the services are replicated among the server modules in non-correlated fashion.

16. The method of claim 15, wherein the assigning uses a random number generator to distribute the services to the server modules using a probabilistic model.

17. The method of claim 15, wherein the assigning uses a hash table to distribute services to the server modules.

18. The method of claim 15, wherein the assigning uses a k-subset model to distribute services to the server modules.

19. The method of claim 1, wherein the providing comprises deploying all of the server modules to provide services to the client modules, wherein all of the server modules concurrently have an active status.

20. The method of claim 1, wherein the providing comprises deploying the server modules such that none of the server modules serves the role of idle backup.

21. One or more computer-readable storage media containing machine-readable instructions for implementing the method of claim 1.

22. An apparatus including logic configured to implement the method of claim 1.

23. A method for configuring infrastructure used to transmit information to client modules via a set of services, comprising:

determining at least one requirement of the infrastructure;

determining, via a processor executing instructions of a service configuration determination module, whether said at least one requirement can be satisfied based on whether the following equation is satisfied:

$$\vec{I} \cdot \vec{r} = \sum_{i=1}^{n} I_i r_i \leq 1,$$

where $\vec{I}$ defines an input cost fraction vector, $\vec{r}$ defines a replication constant vector, and n is equal to or greater than two, each input cost fraction defining a fraction of input capacity of a sever module consumed by maintaining a particular service, each replication constant defining a minimum percentage of server modules that the particular service should be maintained on;

if said at least one requirement can be satisfied, designing a number of m server modules based on a linear function that relates an expected number of client modules to the number m of server modules that should be provided by the infrastructure, wherein the number of m server modules is designed based on the following equation:

$$m=c(EV(\text{user})),$$

where EV(user) defines an expected output cost fraction for an individual user, and c defines an expected number of client modules greater than zero; and providing the infrastructure which satisfies said at least one requirement.

24. One or more computer-readable storage media containing machine-readable instructions for implementing the method of claim 23.

25. An apparatus including logic configured to implement the method of claim 23.

26. A method for configuring infrastructure used to transmit information to client modules, comprising:

determining at least one requirement of the infrastructure;

determining, via a processor executing instructions of a service configuration determination module, if said at least one requirement can be satisfied, a number m of information-transmission modules that should be provided by the infrastructure based on the following equation:

$$m = c(EV(\text{user})),$$

where EV(user) defines an expected output cost fraction for an individual user, and c defines an expected number of client modules greater than zero, wherein EV(user) is computed as:

$$EV(\text{user}) = \sum_{i=1}^{\tau} EV(streamdisplaytype_i) * u_i,$$

where 
$$EV(streamdisplaytype) = \left( \frac{\sum_{i=1}^{j} O_i r_i}{\sum_{i=1}^{j} r_i} \right),$$

and where j is the number of services in a stream display type greater than zero, $\vec{O}$ defines an output cost fraction vector, each output cost fraction describing a fraction of server module output capacity consumed by providing a particular service, $\vec{r}$ defines a replication constant vector, each replication constant defining a minimum percentage of server modules that the particular service should be maintained on, and $u_j$ defines a number of simultaneous streams that can output for a given display type; and providing the infrastructure that includes said number of information-transmission modules.

27. One or more computer-readable storage media containing machine-readable instructions for implementing the method of claim 26.

28. An apparatus including logic configured to implement the method of claim 26.

* * * * *